US010323205B2

(12) United States Patent
Fletcher et al.

(10) Patent No.: US 10,323,205 B2
(45) Date of Patent: Jun. 18, 2019

(54) LUBRICANT COMPOSITIONS FOR REDUCING TIMING CHAIN STRETCH

(71) Applicant: Afton Chemical Corporation, Richmond, VA (US)

(72) Inventors: Kristin Fletcher, Richmond, VA (US); William Y. Lam, Glen Allen, VA (US)

(73) Assignee: AFTON CHEMICAL CORPORATION, Richmond, VA (US)

( * ) Notice: Subject to any disclaimer, the term of this patent is extended or adjusted under 35 U.S.C. 154(b) by 0 days.

(21) Appl. No.: 15/147,211

(22) Filed: May 5, 2016

(65) Prior Publication Data

US 2017/0321146 A1 Nov. 9, 2017

(51) Int. Cl.

| | |
|---|---|
| ***C07F 5/04*** | (2006.01) |
| ***C10M 137/10*** | (2006.01) |
| ***C10M 141/12*** | (2006.01) |
| ***C10M 135/10*** | (2006.01) |
| ***C10M 139/00*** | (2006.01) |
| ***C10M 141/10*** | (2006.01) |
| ***C10M 161/00*** | (2006.01) |
| *C10N 10/12* | (2006.01) |
| *C10N 10/04* | (2006.01) |
| *C10N 30/06* | (2006.01) |

(52) U.S. Cl.

CPC ........ *C10M 141/12* (2013.01); *C10M 135/10* (2013.01); *C10M 137/10* (2013.01); *C10M 139/00* (2013.01); *C10M 141/10* (2013.01); *C10M 161/00* (2013.01); *C10M 2205/028* (2013.01); *C10M 2209/086* (2013.01); *C10M 2215/28* (2013.01); *C10M 2217/06* (2013.01); *C10M 2219/044* (2013.01); *C10M 2219/046* (2013.01); *C10M 2223/045* (2013.01); *C10M 2227/00* (2013.01); *C10N 2010/04* (2013.01); *C10N 2010/12* (2013.01); *C10N 2030/06* (2013.01); *C10N 2210/02* (2013.01); *C10N 2210/06* (2013.01); *C10N 2220/022* (2013.01); *C10N 2230/06* (2013.01); *C10N 2230/52* (2013.01); *C10N 2240/10* (2013.01); *C10N 2240/104* (2013.01); *C10N 2260/09* (2013.01); *C10N 2260/14* (2013.01); *F02B 2275/08* (2013.01)

(58) Field of Classification Search

CPC .............. C10M 139/06; C10M 159/20; C10M 137/10; C10M 2219/068

USPC ................................................. 508/185, 369

See application file for complete search history.

(56) References Cited

U.S. PATENT DOCUMENTS

| | | | |
|---|---|---|---|
| 3,178,663 | A | 4/1965 | Kahn |
| 3,185,647 | A | 5/1965 | Anderson et al. |
| 3,189,544 | A | 6/1965 | Hyman et al. |
| 3,256,185 | A | 6/1966 | Le Suer |
| 3,312,619 | A | 4/1967 | Dale |
| 3,366,569 | A | 1/1968 | Norman et al. |
| 3,390,086 | A | 6/1968 | Rosemary et al. |
| 3,458,530 | A | 7/1968 | Siegel et al. |
| 3,403,102 | A | 9/1968 | Le Suer |
| 3,470,098 | A | 9/1969 | O'Halloran |
| 3,502,677 | A | 3/1970 | Sner |
| 3,519,564 | A | 7/1970 | Vogel |
| 3,546,243 | A | 12/1970 | Coupland |
| 3,573,205 | A | 3/1971 | Lowe et al. |
| 3,634,515 | A | 1/1972 | Piasek et al. |
| 3,649,229 | A | 3/1972 | Otto |
| 3,708,522 | A | 1/1973 | LeSuer |
| 3,718,663 | A | 2/1973 | Lee et al. |
| 3,749,695 | A | 7/1973 | De Vries |
| 3,859,318 | A | 1/1975 | Le Suer |
| 3,865,740 | A | 2/1975 | Goldschmidt |
| 3,865,813 | A | 2/1975 | Gergel |
| 3,954,639 | A | 5/1976 | Liston |

(Continued)

FOREIGN PATENT DOCUMENTS

| | | | |
|---|---|---|---|
| EP | 0612839 | A1 | 8/1994 |
| EP | 1316564 | A2 | 6/2003 |

(Continued)

OTHER PUBLICATIONS

Dahnz, Christoph, et al. "Investigations on pre-ignition in highly supercharged SI engines." SAE International Journal of Engines 3.1 (2010): 214-224.

Zahdeh, Akram, et al. "Fundamental approach to investigate pre-ignition in boosted SI engines." SAE International Journal of Engines 4.1 (2011): 246-273.

Takeuchi, Kazuo, et al. "Investigation of engine oil effect on abnormal combustion in turbocharged direct injection-spark ignition engines." SAE International Journal of Fuels and Lubricants 5.3 (2012): 1017-1024.

(Continued)

*Primary Examiner* — Prem C Singh
*Assistant Examiner* — Francis C Campanell
(74) *Attorney, Agent, or Firm* — Mendelsohn Dunleavy, P.C.

(57) ABSTRACT

A method for reducing timing chain stretch in an engine comprising a step of lubricating said timing chain with a lubricating oil composition that includes a major amount of a base oil; and a minor amount of an additive package including (a) at least one overbased calcium detergent, (b) at least one borated dispersant, (c) a metal dialkyl dithiophosphate, and (d) at least one molybdenum compound. The lubricating oil composition has a TBN value of at least 7.5 mg KOH/g of the lubricating oil composition, at least 80 ppm of molybdenum, based on the total weight of the lubricating oil composition, a weight ratio of total calcium in the lubricating oil composition to total molybdenum in the lubricating oil composition of less than 8.4; and a weight ratio of nitrogen from the dispersant in the lubricating composition to total boron in the lubricating oil composition of from 2.6 to 3.0.

20 Claims, No Drawings

(56) References Cited

U.S. PATENT DOCUMENTS

| | | | |
|---|---|---|---|
| 4,152,499 | A | 5/1979 | Boerzel et al. |
| 4,234,435 | A | 11/1980 | Meinhardt et al. |
| 4,259,194 | A | 3/1981 | DeVries et al. |
| 4,259,195 | A | 3/1981 | King et al. |
| 4,261,843 | A | 4/1981 | King et al. |
| 4,263,152 | A | 4/1981 | King et al. |
| 4,265,773 | A | 5/1981 | DeVries et al. |
| 4,272,387 | A | 6/1981 | King et al. |
| 4,283,295 | A | 8/1981 | DeVries et al. |
| 4,285,822 | A | 8/1981 | DeVries et al. |
| 4,379,064 | A | 4/1983 | Cengel et al. |
| 4,482,464 | A | 11/1984 | Karol et al. |
| 4,521,318 | A | 6/1985 | Karol |
| 4,554,086 | A | 11/1985 | Karol et al. |
| 4,579,675 | A | 4/1986 | Sawicki et al. |
| 4,612,132 | A | 9/1986 | Wollenberg et al. |
| 4,614,522 | A | 9/1986 | Buckley |
| 4,614,603 | A | 9/1986 | Wollenberg |
| 4,617,137 | A | 10/1986 | Plavac |
| 4,617,138 | A | 10/1986 | Wollenberg |
| 4,636,322 | A | 1/1987 | Nalesnik |
| 4,645,515 | A | 2/1987 | Wollenberg |
| 4,646,860 | A | 3/1987 | Owens et al. |
| 4,647,390 | A | 3/1987 | Buckley, III et al. |
| 4,648,886 | A | 3/1987 | Buckley, III et al. |
| 4,648,980 | A | 3/1987 | Erdman |
| 4,652,387 | A | 3/1987 | Andress, Jr. et al. |
| 4,663,062 | A | 5/1987 | Wollenberg |
| 4,663,064 | A | 5/1987 | Nalesnik et al. |
| 4,666,459 | A | 5/1987 | Wollenberg |
| 4,666,460 | A | 5/1987 | Wollenberg |
| 4,668,246 | A | 5/1987 | Wollenberg |
| 4,670,170 | A | 6/1987 | Wollenberg |
| 4,699,724 | A | 10/1987 | Nalesnik et al. |
| 4,713,189 | A | 12/1987 | Nalesnik et al. |
| 4,713,191 | A | 12/1987 | Nalesnik |
| 4,857,214 | A | 8/1989 | Papay et al. |
| 4,948,386 | A | 8/1990 | Sung et al. |
| 4,963,275 | A | 10/1990 | Gutierrez et al. |
| 4,963,278 | A | 10/1990 | Blain et al. |
| 4,971,598 | A | 11/1990 | Andress et al. |
| 4,971,711 | A | 11/1990 | Lundberg et al. |
| 4,973,412 | A | 11/1990 | Migdal et al. |
| 4,981,492 | A | 1/1991 | Blain et al. |
| 5,026,495 | A | 6/1991 | Emert et al. |
| 5,030,249 | A | 7/1991 | Herbstman |
| 5,039,307 | A | 8/1991 | Herbstman et al. |
| 5,204,012 | A | 4/1993 | Schaffhausen |
| 5,241,003 | A | 8/1993 | Degonia et al. |
| 5,334,321 | A | 8/1994 | Harrison et al. |
| 3,278,550 | A | 10/1996 | Norman et al. |
| 5,650,381 | A | 7/1997 | Gatto et al. |
| 5,739,355 | A | 4/1998 | Gateau et al. |
| 5,883,057 | A | 3/1999 | Roell, Jr. et al. |
| 6,034,040 | A | 3/2000 | Ozbalik et al. |
| RE37,363 | E | 9/2001 | Gatto et al. |
| 6,300,291 | B1 | 10/2001 | Hartley et al. |
| 6,723,685 | B2 | 4/2004 | Hartley et al. |
| RE38,929 | E | 1/2006 | Gatto et al. |
| 7,053,026 | B2 | 5/2006 | Li |
| 7,214,649 | B2 | 5/2007 | Loper et al. |
| RE40,595 | E | 12/2008 | Gatto et al. |
| 7,572,200 | B2 | 8/2009 | Murata et al. |
| 7,645,726 | B2 | 1/2010 | Loper |
| 7,732,390 | B2 | 6/2010 | Kadkhodayan et al. |
| 7,897,696 | B2 | 3/2011 | Huang et al. |
| 8,048,831 | B2 | 11/2011 | Loper |
| 8,771,119 | B2 | 7/2014 | Tanaka |
| 8,999,905 | B2 | 4/2015 | Duggal |
| 2002/0038525 | A1 | 4/2002 | Callis et al. |
| 2012/0101017 | A1 | 4/2012 | Duggal |
| 2012/0202723 | A1 | 8/2012 | Abbey et al. |
| 2014/0179571 | A1* | 6/2014 | Loper .................. C10M 133/16 508/278 |
| 2015/0034047 | A1 | 2/2015 | Yaguchi et al. |
| 2015/0307802 | A1 | 10/2015 | Ritchie et al. |
| 2015/0322367 | A1 | 11/2015 | Patel et al. |
| 2015/0322368 | A1 | 11/2015 | Patel et al. |
| 2015/0322369 | A1* | 11/2015 | Patel .................... C10M 163/00 508/162 |

FOREIGN PATENT DOCUMENTS

| | | | |
|---|---|---|---|
| EP | 2990469 | A1 | 3/2016 |
| GB | 1065595 | A1 | 4/1967 |
| GB | 2140811 | A1 | 12/1984 |
| JP | 2014152301 | A1 | 8/2014 |
| WO | WO9406897 | A1 | 3/1994 |
| WO | 2015023559 | A1 | 2/2015 |
| WO | 2015042337 | A1 | 3/2015 |
| WO | 2015042340 | A1 | 3/2015 |
| WO | 2015042341 | A1 | 3/2015 |

OTHER PUBLICATIONS

Palaveev, Stefan, et al. “Premature Flame Initiation in a Turbocharged DISI Engine-Numerical and Experimental Investigations.” SAE International Journal of Engines 6.1 (2013): 54-66.

Hirano, Satoshi, et al. Investigation of Engine Oil Effect on Abnormal Combustion in Turbocharged Direct Injection-Spark Ignition Engines (Part 2). No. 2013-01-2569. SAE Technical Paper, 2013.

Okada, Yoshihiro, et al. “Study of low-speed pre-ignition in boosted spark ignition engine.” SAE International Journal of Engines 7.2 (2014): 584-594.

Dingle, Simon F., et al. Lubricant induced pre-ignition in an optical SI engine. No. 2014-01-1222. SAE Technical Paper, 2014.

Qi, Yunliang, et al. The effect of oil intrusion on super knock in gasoline engine. No. 2014-01-1224. SAE Technical Paper, 2014.

Ohtomo, Mitsuaki, et al. “Pre-ignition of gasoline-air mixture triggered by a lubricant oil droplet.” SAE International Journal of Fuels and Lubricants 7.3 (2014): 673-682.

Fujimoto, Kosuke, et al. “Engine oil development for preventing pre-ignition in turbocharged gasoline engine.” SAE International Journal of Fuels and Lubricants 7.3 (2014): 869-874.

Moriyoshi, Yasuo, et al. “A Study of Low Speed Preignition Mechanism in Highly Boosted SI Gasoline Engines.” SAE International Journal of Engines 9.2015-01-1865 (2015).

“Relative Impact of Chemical and Physical Properties of the Oil-Fuel Droplet on Pre-Ignition and Superknock in Turbocharged Gasoline Engines,” SAE 2016 Powertrain Baltimore—Manuscript—Droplet Pre-ignition_v10, pp. 1-12.

Ritchie, Andrew, Doyle Boese, and Anne W. Young. “Controlling Low-Speed Pre-Ignition in Modern Automotive Equipment Part 3: Identification of Key Additive Component Types and Other Lubricant Composition Effects on Low-Speed Pre-Ignition.” SAE International Journal of Engines 9.2016-01-0717 (2016).

Mayer, Mattias, et al. “Influence of Different Oil Properties on Low-Speed Pre-Ignition in Turbocharged Direct Injection Spark Ignition Engines,” No. 2016-01-0718. SAE Technical Paper, 2016.

Andrews, Arthur, et al. “Investigation of Engine Oil Base Stock Effects on Low Speed Pre-Ignition in a Turbocharged Direct Injection SI Engine,” No. 2016-01-9071. SAE Technical Paper, 2016.

Fletcher, K. A. et al. “Engine Oil Additive Impacts on Low Speed Preignition,” Afton Chemical Corp. SAE International, 2016, 7 pages.

EO LSPI IP Discussion Presentation, Feb. 9, 2015, 11 pages.

Update: EO LSPI IP Filing Plan Presentation, Mar. 17, 2015, pp. title-35.

Onodera, Ko, et al. Engine Oil Formulation Technology to Prevent Pre-ignition in Turbocharged Direct Injection Spark Ignition Engines. No. 2015-01-2027. SAE Technical Paper, 2015.

Elliott, Ian, et al. Understanding Low Speed Pre-Ignition Phenomena across Turbo-Charged GDI Engines and Impact on Future Engine Oil Design. No. 2015-01-2028. SAE Technical Paper, 2015.

Long, Yan, et al. Effect of Oil and Gasoline Properties on Pre-Ignition and Super-Knock in a Thermal Research Engine (TRE) and an Optical Rapid Compression Machine (RCM). No. 2016-01-0720. SAE Technical Paper, 2016.

(56) References Cited

OTHER PUBLICATIONS

Tamura, Kazushi, et al. "Abnormal Combustion Induced by Combustion Chamber Deposits Derived from Engine Oil Additives in a Spark-Ignited Engine." SAE International Journal of Engines 8.1 (2015): 200-205.

"Investigation of Lubrication Effect on a Diesel Engine Timing Chain Wear," Polat, Ozay, M.Sc. Thesis Istanbul Technical University Institute of Science and Technology (Jan. 2008).

Li, Shoutian, et al. Wear in Cummins M-11/EGR test engines. No. 2002-01-1672. SAE Technical Paper, 2002.

Polat, Ozay, et al. "Timing chain wear assessment with different type of oils." No. 2009-01-0198. SAE Technical Paper, 2009.

Gautam, Mridul, et al. "Contribution of soot contaminated oils to wear" No. 981406. SAE Technical Paper, 1998.

"Ford Chain Wear Engine Test Understanding for Patent Filing," Afton Chemical, Jul. 21, 2015.

"Relative Impact of Chemical and Physical Properties of the Oil-Fuel Droplet on Pre-Ignition and Superknock in Turbocharged Gasoline Engines," SAE 2016 Powertrain Baltimore—Manuscipt—Droplet Pre-ignition_v10, pp. -12.

La Rocca, A., et al. "Characterisation of soot in oil from a gasoline direct injection engine using transmission electron microscopy." Tribology International 86 (2015): 77-84.

Takeuchi, Kazuo, et al. "Investigation of engine oil effect on abnormal combustion in turbocharged direct injection-spark ignition engines." SAE International Journal of Fuels and Lubricants 5.2012-01-1615 (2012): 1017-1024.

International Search Report and Written Opinion; dated May 29, 2017 for PCT Application No. PCT/US2017/019892.

* cited by examiner

LUBRICANT COMPOSITIONS FOR REDUCING TIMING CHAIN STRETCH

TECHNICAL FIELD

The disclosure relates to lubricating oil compositions and in particular to lubricating oil additive compositions and methods for reducing timing chain stretch using lubricating compositions.

BACKGROUND

In an internal combustion engine there may be a metal chain, also known as a timing chain, comprised of bearing pins, rollers, bushings, and an inner and outer plate. Due to the significant load and friction exerted on these components, the timing chain is susceptible to significant wear including corrosive wear. To address this problem lubricants are used to reduce wear between moving parts where there is metal to metal contact.

Chain elongation, or timing chain stretch, is a phenomenon that occurs in internal combustion engines with a timing chain that has deteriorated due to wear. Chain elongation mainly occurs at the pin, bushing and side plate wear contact interfaces. Timing chain stretch can lead to significant problems in operation of the internal combustion engine and can have an effect on engine performance, fuel economy and emissions.

Chain elongation can cause a deviation from the desired timing of parts operatively connected to the timing chain. Such a deviation may be caused, for example, by the chain skipping one or more sprocket teeth during operation, or exceeding the adjustability of the cam phasers. These deviations may alter the relative timing of the valves and ignition. Intake valve timing affects when the air and/or fuel mixture is drawn into the cylinder. Exhaust valve timing affects power output as power can be lost as a result of escape of gas via the exhaust valve if the exhaust valve does not open at the appropriate time. Additionally, unburned hydrocarbon emissions can increase when exhaust valve timing is off since unburned combustion gas may escape via the exhaust valve under such circumstances.

The effects of different base oils on diesel engine timing chain wear were investigated in, "Investigation of Lubrication Effect on a Diesel Engine Timing Chain Wear," Polat, Ozay, M. Sc. Thesis Istanbul Technical University Institute of Science and Technology (January 2008). This thesis concluded that the selection of base oil could influence timing chain wear in diesel engines.

Timing chain wear in light-duty diesel engines is due to a variety of factors one of which is the contribution of soot to abrasive wear. Li, Shoutian, et al., "Wear in Cummins M-11/EGR Test Engines," Society of Automotive Engineers, Inc. (2001), paper no. 2002-01-1672. This article mentions that in engines with an exhaust gas recirculation (EGR) system, soot caused abrasive wear on liners, crossheads and top ring faces. The article also mentions that the main focus of soot-induced wear in non-EGR diesel engines has been on roller pin wear in the GM 6.2 L engine and crosshead wear in the Cummins M-11.

Chain elongation in gasoline engines is typically the result of roller pin wear. As a result, prior art methods for addressing timing chain stretch typically focus on use and selection of anti-wear agents. With the use of TGDi engines, soot is now a by-product of gasoline engine combustion and thus chain elongation due to such soot production may occur in such engines.

Lubricants currently used in gasoline engines to reduce timing chain stretch contain antiwear agents as it is thought that these additives are able reduce the timing chain wear. However, as demonstrated in the examples of the present application, certain typical anti-wear agents worsened timing chain stretch. In order to overcome the wear problem that results in timing chain stretch, a solution for reducing the rolling and sliding friction forces that cause roller pin wear is sought.

In some cases, dispersants and dispersant viscosity index improvers have been used to address wear problems. For example, U.S. Pat. No. 7,572,200 B2 discloses a chain drive system that employs a lubricant designed to coat the sliding parts of the system, including the chain and sprocket, with a thin hard carbon coating film having a hydrogen content of 10 atomic percent or less to reduce the amount of friction and wear on the chain drive system.

U.S. Pat. No. 8,771,119 B2 discloses a lubricating composition for a chain which comprises 80-95% by mass of a lubricant which is liquid at room temperature and 5-20% by mass of a wax that is a solid at room temperature. The addition of the wax is said to provide better abrasion resistance and provide a chain with elongation resistance and a longer life.

U.S. Pat. No. 7,053,026 B2 discloses a method for lubricating a conveyor chain system. Conveyor chains may be exposed to high temperatures and usually require polyol ester based lubricants. This patent focuses on reducing chain wear and minimizing deposits on chain surfaces by using a mixture of mineral oil, poly(isobutylene) and polyol ester.

The foregoing references do not provide an adequate solution for minimizing timing chain stretch in internal combustion engines. For example, the proposed use of dispersants for this purpose has been found to provide inadequate protection against timing chain stretch. Thus, the present disclosure provides a method of employing calcium detergents and detergent combinations in order to provide greater reductions in chain elongation than is provided by combinations of conventional anti-wear agents or dispersants.

SUMMARY AND TERMS

In a first aspect, the disclosure relates to a method for reducing timing chain stretch in an engine comprising a step of lubricating said timing chain with a lubricating oil composition comprising:

a major amount of a base oil; and a minor amount of an additive package including:

a) at least one overbased calcium detergent, b) at least one borated dispersant, c) a metal dialkyl dithiophosphate, and;

d) at least one oil soluble molybdenum compound;

wherein the lubricating oil composition has a TBN value of at least 7.5 mg KOH/gram lubricating oil composition, determined using the method of ASTM-2896, at least 80 ppm of molybdenum based on a total weight of the lubricating oil composition, a weight ratio of total calcium in the lubricating oil composition to total molybdenum in the lubricating oil composition of less than 8.4; and a weight ratio of nitrogen from the dispersant in the lubricating composition to total boron in the lubricating oil composition of from 2.6 to 3.0.

In certain embodiments, the base oil has a SAE Viscosity grade of 5W and the lubricating oil composition has a ratio of total ppm of boron in the lubricating oil composition to the TBN of total detergent of from 45 to 63 or from 50 to 63, or from 56 to 63.

In all the foregoing embodiments, the lubricating oil composition may have a weight ratio of total boron in the lubricating oil composition to total nitrogen in the lubricating oil composition of less than 1.0.

In all the foregoing embodiments, the lubricating oil composition may have a weight ratio of total sulfur in the lubricating oil composition to total molybdenum in the lubricating oil composition of from about 1:1 to 17:1.

In each of the foregoing embodiments the base oil may have a SAE viscosity grade of 5W-30 and the lubricating oil composition may have a molybdenum content of greater than 150 ppm.

In all the foregoing embodiments, the lubricating oil composition ma contain from 1000 ppm to 1800 ppm of calcium, or from 1100 ppm to 1600 ppm, or from 1200 to 1500 ppm calcium from the overbased calcium-containing detergent, based on a total weight of the lubricating oil composition.

In all the foregoing embodiments, the overbased calcium detergent may comprise from about 0.9 wt. % to about 10 wt. %, or from about 1 wt. % to about 5 wt. %, or from about 1 wt. % to about 2 wt. % of the lubricating composition.

In all the foregoing embodiments, the lubricating oil may have a phosphorus content of 100-1000 ppm, or 200-900 ppm, or 300 to 800 ppm.

In all the foregoing embodiments, the additive package may additionally include one or more additives selected from antioxidants, friction modifiers, pour point depressants, and viscosity index improvers.

In all the foregoing embodiments, the lubricating oil may have a weight ratio of ppm metal from the detergent in the lubricating oil composition to the total ppm of boron in the lubricating oil composition of from 5.7 to 8.5 or from 5.7 to 6.5.

In all the foregoing embodiments, the at least one metal dialkyl dithiophosphate may be at least one zinc dialkyl dithiophosphate.

In each of the foregoing embodiments, the lubricating oil composition may have a Zn content of from 700 ppm to 900 ppm delivered to the lubricating oil by zinc dialkyl dithiophosphate(s).

In all the foregoing embodiments, the additive package may include at least one detergent selected from the group consisting of a magnesium sulfonate detergent, and a neutral calcium sulfonate detergent.

In all the foregoing embodiments, the additive package may include a magnesium sulfonate detergent.

In all the foregoing embodiments, the lubricating oil composition may have a boron content no greater than 310 ppm.

In all the foregoing embodiments, the lubricating oil composition may include at least one non-borated dispersant.

In all the foregoing embodiments, the engine may be a spark ignition engine.

In all the foregoing embodiments, the engine may be a spark ignition passenger car gasoline engine.

In each of the foregoing embodiments, the dispersant may contain a reaction product of an olefin copolymer with at least one polyamine or a reaction product of an olefin copolymer with a succinic anhydride, and at least one polyamine, wherein the reaction product is post-treated with an aromatic carboxylic acid, an aromatic polycarboxylic acid, or an aromatic anhydride wherein all carboxylic acid or anhydride groups are attached directly to an aromatic ring, and with a non-aromatic dicarboxylic acid or anhydride having a number average molecular weight of less than 500.

In each of the foregoing embodiments the lubricating oil composition may have a total molybdenum content of at least 100 ppm.

In the foregoing embodiments, the base oil may have a viscosity grade of 0W-16, and the lubricating oil composition may have a boron content of at least 200 ppm, a molybdenum content of at least 600 ppm, and a sulfur content of no greater than about 2550 ppm.

In all the foregoing embodiments, the lubricating oil composition may be capable of reducing the timing chain stretch or elongation in an engine to 0.1% or less, or 0.05% or less, as measured by the Ford Chain Wear Test over 216 hours.

Additional features and advantages of the disclosure may be set forth in part in the description which follows, and/or may be learned by practice of the disclosure. The features and advantages of the disclosure may be further realized and attained by means of the elements and combinations particularly pointed out in the appended claims.

It is to be understood that both the foregoing general description and the following detailed description are exemplary and explanatory only and are not restrictive of the invention as claimed.

DETAILED DESCRIPTION OF THE INVENTION

The following definitions of terms are provided in order to clarify the meanings of certain terms as used herein.

The terms "oil composition," "lubrication composition," "lubricating oil composition," "lubricating oil," "lubricant composition," "lubricating composition," "fully formulated lubricant composition," "lubricant," "crankcase oil," "crankcase lubricant," "engine oil," "engine lubricant," "motor oil," and "motor lubricant" are considered synonymous, fully interchangeable terminology referring to the finished lubrication product comprising a major amount of a base oil plus a minor amount of an additive composition.

As used herein, the terms "additive package," "additive concentrate," "additive composition," "engine oil additive package," "engine oil additive concentrate," "crankcase additive package," "crankcase additive concentrate," "motor oil additive package," "motor oil concentrate," are considered synonymous, fully interchangeable terminology referring the portion of the lubricating composition excluding the major amount of base oil stock mixture. The additive package may or may not include the viscosity index improver or pour point depressant.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(a) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic moiety);

(b) substituted hydrocarbon substituents, that is, substituents containing non-hydrocarbon groups which, in the context of this disclosure, do not alter the predominantly hydrocarbon substituent (e.g., halo (especially chloro and fluoro), hydroxy, alkoxy, mercapto, alkylmercapto, nitro, nitroso, amino, alkylamino, and sulfoxy); and (c) hetero substituents, that is, substituents which, while having a predominantly hydrocarbon character, in the context of this disclosure, contain other than carbon in a ring or chain otherwise composed of carbon atoms. Heteroatoms may include sulfur, oxygen, and nitrogen, and encompass substituents such as pyridyl, furyl, thienyl, and imidazolyl. In general, no more than two, for example, no more than one, non-hydrocarbon substituent will be present for every ten carbon atoms in the hydrocarbyl group; typically, there will be no non-hydrocarbon substituents in the hydrocarbyl group.

As used herein, the term "percent by weight", unless expressly stated otherwise, means the percentage the recited component represents to the weight of the entire composition.

The terms "soluble," "oil-soluble" or "dispersible" used herein may, but do not necessarily, indicate that the compounds or additives are soluble, dissolvable, miscible, or capable of being suspended in the oil in all proportions. The foregoing terms do mean, however, that they are, for instance, soluble, suspendable, dissolvable, or stably dispersible in oil to an extent sufficient to exert their intended effect in the environment in which the oil is employed. Moreover, the additional incorporation of other additives may also permit incorporation of higher levels of a particular additive, if desired.

The term "TBN" as employed herein is used to denote the Total Base Number in mg KOH/g of the composition as measured by the method of ASTM D2896 or ASTM D4739.

The term "alkyl" as employed herein refers to straight, branched, cyclic, and/or substituted saturated chain moieties of from about 1 to about 100 carbon atoms.

The term "alkenyl" as employed herein refers to straight, branched, cyclic, and/or substituted unsaturated chain moieties of from about 3 to about 10 carbon atoms.

The term "aryl" as employed herein refers to single and multi-ring aromatic compounds that may include alkyl, alkenyl, alkylaryl, amino, hydroxyl, alkoxy, halo substituents, and/or heteroatoms including, but not limited to, nitrogen, oxygen, and sulfur.

Unless stated otherwise, all percentages are in weight percent, all ppm values are parts per million by weight (ppmw) and all molecular weights are number average molecular weights.

It must be noted that as used herein and in the appended claims, the singular forms "a", "an", and "the" include plural references unless the context clearly dictates otherwise. Furthermore, the terms "a" (or "an"), "one or more", and "at least one" can be used interchangeably herein. The terms "comprising", "including", "having" and "constructed from" can also be used interchangeably.

It is to be understood that each component, compound, substituent, or parameter disclosed herein is to be interpreted as being disclosed for use alone or in combination with one or more of each and every other component, compound, substituent, or parameter disclosed herein.

It is also to be understood that each amount/value or range of amounts/values for each component, compound, substituent, or parameter disclosed herein is to be interpreted as also being disclosed in combination with each amount/value or range of amounts/values disclosed for any other component(s), compounds(s), substituent(s), or parameter(s) disclosed herein and that any combination of amounts/values or ranges of amounts/values for two or more component(s), compounds(s), substituent(s), or parameters disclosed herein are thus also disclosed in combination with each other for the purposes of this description.

It is further understood that each lower limit of each range disclosed herein is to be interpreted as disclosed in combination with each upper limit of each range disclosed herein for the same component, compounds, substituent, or parameter. Thus, a disclosure of two ranges is to be interpreted as a disclosure of four ranges derived by combining each lower limit of each range with each upper limit of each range. A disclosure of three ranges is to be interpreted as a disclosure of nine ranges derived by combining each lower limit of each range with each upper limit of each range, etc. Furthermore, specific amounts/values of a component, compound, substituent, or parameter disclosed in the description or an example is to be interpreted as a disclosure of either a lower or an upper limit of a range and thus can be combined with any other lower or upper limit of a range or specific amount/value for the same component, compound, substituent, or parameter disclosed elsewhere in the application to form a range for that component, compound, substituent, or parameter.

Lubricants, combinations of components, or individual components of the present description may be suitable for use for lubricating of the timing chain in various types of internal combustion engines. An internal combustion engine may be a gasoline fueled engine, a mixed gasoline/biofuel fueled engine, an alcohol fueled engine, or a mixed gasoline/alcohol fueled engine. A gasoline engine may be a spark-ignited engine. An internal combustion engine may also be used in combination with an electrical or battery source of power. An engine so configured is commonly known as a hybrid engine. The internal combustion engine may be a 2-stroke, 4-stroke, or rotary engine. Suitable internal combustion engines include marine engines, aviation piston engines, and motorcycle, automobile, locomotive, and truck engines.

The internal combustion engine may contain components of one or more of an aluminum-alloy, lead, tin, copper, cast iron, magnesium, ceramics, stainless steel, composites, and/or mixtures thereof. The components may be coated, for example, with a diamond-like carbon coating, a lubrited coating, a phosphorus-containing coating, molybdenum-containing coating, a graphite coating, a nano-particle-containing coating, and/or mixtures thereof. The aluminum-alloy may include aluminum silicates, aluminum oxides, or other ceramic materials. In one embodiment the aluminum-alloy is an aluminum-silicate surface. As used herein, the term "aluminum alloy" is intended to be synonymous with "aluminum composite" and to describe a component or surface comprising aluminum and another component intermixed or reacted on a microscopic or nearly microscopic level, regardless of the detailed structure thereof. This would include any conventional alloys with metals other than aluminum as well as composite or alloy-like structures with non-metallic elements or compounds such with ceramic-like materials.

The lubricant composition of the present disclosure may be suitable for any engine lubricant irrespective of the sulfur, phosphorus, or sulfated ash (ASTM D-874) content. The sulfur content of the lubricating oil may be about 1 wt. % or less, or about 0.8 wt. % or less, or about 0.5 wt. % or less, or about 0.3 wt. % or less. In one embodiment the sulfur content may be in the range of about 0.001 wt. % to about 0.5 wt. %, or about 0.01 wt. % to about 0.3 wt. %. The phosphorus content may be about 0.2 wt. % or less, or about 0.1 wt. % or less, or about 0.085 wt. % or less, or about 0.08 wt. % or less, or even about 0.06 wt. % or less, about 0.055 wt. % or less, or about 0.05 wt. % or less.

In one embodiment the phosphorus content of the lubricant compositions of the present disclosure may be about 100 ppm to about 1000 ppm, or about 325 ppm to about 850 ppm. The total sulfated ash content may be about 2 wt. % or less, or about 1.5 wt. % or less, or about 1.1 wt. % or less, or about 1 wt. % or less, or about 0.8 wt. % or less, or about 0.5 wt. % or less. In one embodiment the sulfated ash content may be about 0.05 wt. % to about 0.9 wt. %, or about 0.1 wt. % or about 0.2 wt. % to about 0.45 wt. %. In another embodiment, the sulfur content may be about 0.4 wt. % or less, the phosphorus content may be about 0.08 wt. % or less, and the sulfated ash is about 1 wt. % or less. In yet another embodiment the sulfur content may be about 0.3 wt. % or less, the phosphorus content is about 0.05 wt. % or less, and the sulfated ash may be about 0.8 wt. % or less.

In one embodiment the lubricating composition is also suitable for use as an engine oil, for example, for lubrication of the crankcase of an engine. In other embodiments, the lubricating composition may have (i) a sulfur content of about 0.5 wt. % or less, (ii) a phosphorus content of about 0.1 wt. % or less, and (iii) a sulfated ash content of about 1.5 wt. % or less.

In some embodiments, the lubricating composition is not suitable for a 2-stroke or a 4-stroke marine diesel internal combustion engine for one or more reasons, including but not limited to, the high sulfur content of fuel used in powering a marine engine and the high TBN required for a marine-suitable engine oil (e.g., above about 40 TBN in a marine-suitable engine oil).

In some embodiments, the lubricating composition is suitable for use with engines powered by low sulfur fuels, such as fuels containing about 1 to about 5% sulfur. Highway vehicle fuels contain about 15 ppm sulfur (or about 0.0015% sulfur).

Further, lubricants of the present description may be suitable to meet one or more industry specification requirements such as ILSAC GF-3, GF-4, GF-5, GF-6, PC-11, CI-4, CJ-4, ACEA A1/B1, A2/B2, A3/B3, A5/B5, C1, C2, C3, C4, E4/E6/E7/E9, Euro 5/6, Jaso DL-1, Low SAPS, Mid SAPS, or original equipment manufacturer specifications such as Dexos™ 1, Dexos™ 2, MB-Approval 229.51/229.31, VW 502.00, 503.00/503.01, 504.00, 505.00, 506.00/506.01, 507.00, BMW Longlife-04, Porsche C30, Peugeot Citroën Automobiles B71 2290, Ford WSS-M2C153-H, WSS-M2C930-A, WSS-M2C945-A, WSS-M2C913A, WSS-M2C913-B, WSS-M2C913-C, GM 6094-M, Chrysler MS-6395, or any past or future PCMO or HDD specifications not mentioned herein. In some embodiments for passenger car motor oil (PCMO) applications, the amount of phosphorus in the finished fluid is 1000 ppm or less or 900 ppm or less or 800 ppm or less.

Other hardware may not be suitable for use with the disclosed lubricant. A "functional fluid" is a term which encompasses a variety of fluids including but not limited to tractor hydraulic fluids, power transmission fluids including automatic transmission fluids, continuously variable transmission fluids and manual transmission fluids, hydraulic fluids, including tractor hydraulic fluids, some gear oils, power steering fluids, fluids used in wind turbines, compressors, some industrial fluids, and fluids related to power train components. It should be noted that within each class of these fluids such as, for example, automatic transmission fluids, there are a variety of different types of fluids due to the various transmissions having different designs which have led to the need for fluids of markedly different functional characteristics. This is contrasted by the term "lubricating fluid" which is not used to generate or transfer power.

When the functional fluid is an automatic transmission fluid, the automatic transmission fluids must have enough friction for the clutch plates to transfer power. However, the friction coefficient of fluids has a tendency to decline due to the temperature effects as the fluid heats up during operation. It is important that the tractor hydraulic fluid or automatic transmission fluid maintain its high friction coefficient at elevated temperatures, otherwise brake systems or automatic transmissions may fail. This is not a function of the lubricating oil of the present invention.

Tractor fluids, and for example Super Tractor Universal Oils (STUOs) or Universal Tractor Transmission Oils (UTTOs), may combine the performance of engine oils with transmissions, differentials, final-drive planetary gears, wet-brakes, and hydraulic performance. While many of the additives used to formulate a UTTO or a STUO fluid are similar in functionality, they may have deleterious effect if not incorporated properly. For example, some anti-wear and extreme pressure additives can be extremely corrosive to the copper components in hydraulic pumps. Detergents and dispersants used for gasoline or diesel engine performance may be detrimental to wet brake performance. Friction modifiers specific to quiet wet brake noise, may lack the thermal stability required for oil performance. Each of these fluids, whether functional, tractor, or lubricating, are designed to meet specific and stringent manufacturer requirements.

The present disclosure provides, in one embodiment, a method for reducing timing chain stretch in an engine comprising a step of lubricating said timing chain with a lubricating oil composition including:

a major amount of a base oil; and a minor amount of an additive package including:

a) at least one overbased calcium detergent, b) at least one borated dispersant, c) a metal dialkyl dithiophosphate, and;

d) at least one oil soluble molybdenum compound.

Embodiments of the present disclosure may provide improvements in the following characteristics: timing chain stretch or elongation, sludge and/or soot dispersability, and friction reduction, as well as air entrainment, alcohol fuel compatibility, antioxidancy, antiwear performance, biofuel compatibility, foam reducing properties, fuel economy, deposit reduction, pre-ignition prevention, rust inhibition, and water tolerance.

Lubricating oils suitable for use in the methods of the present disclosure may be formulated by the addition of additives, as described in detail below, to an appropriate base oil formulation. The additives may be combined with a base oil in the form of one or more additive packages (or concentrates) or, alternatively, may be combined individually with a base oil. The fully formulated lubricating oil may exhibit improved performance properties, based on the additives added and their respective proportions. Details of the compositions of the lubricating oils useful in the methods of the present invention are set forth below.

Base Oil

The base oil used in the lubricating oil compositions herein may be selected from any of the base oils in Groups I-V as specified in the American Petroleum Institute (API) Base Oil Interchangeability Guidelines. The five base oil groups are as follows:

| Base Oil Groups | | | | |
|---|---|---|---|---|
| Base oil Category | Sulfur (%) | | Saturates (%) | Viscosity Index |
| Group I | >0.03 | and/or | <90 | 80 to 120 |
| Group II | ≤0.03 | and | ≥90 | 80 to 120 |
| Group III | ≤0.03 | and | ≥90 | ≥120 |
| Group IV | All polyalphaolefins (PAOs) | | | |
| Group V | All others not included in Groups I, II, III, or IV | | | |

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that although Group III base oils are derived from mineral oil, the rigorous processing that these fluids undergo causes their physical properties to be very similar to some true synthetics, such as PAOs. Therefore, oils derived from Group III base oils may be referred to as synthetic fluids in the industry.

The base oil used in the lubricating oil composition may be a mineral oil, animal oil, vegetable oil, synthetic oil, or mixtures thereof. Suitable oils may be derived from hydrocracking, hydrogenation, hydrofinishing, unrefined, refined, and re-refined oils, and mixtures thereof.

Unrefined oils are those derived from a natural, mineral, or synthetic source without or with little further purification treatment. Refined oils are similar to the unrefined oils except that they have been treated in one or more purification steps, which may result in the improvement of one or more properties. Examples of suitable purification techniques are solvent extraction, secondary distillation, acid or base extraction, filtration, percolation, and the like. Oils refined to the quality of an edible may or may not be useful. Edible oils may also be called white oils. In some embodiments, lubricant compositions are free of edible or white oils.

Re-refined oils are also known as reclaimed or reprocessed oils. These oils are obtained similarly to refined oils using the same or similar processes. Often these oils are additionally processed by techniques directed to removal of spent additives and oil breakdown products.

Mineral oils may include oils obtained by drilling or from plants and animals or any mixtures thereof. For example such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as α-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof. Polyalphaolefins are typically hydrogenated materials.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

The amount of the oil of lubricating viscosity present may be the balance remaining after subtracting from 100 wt. % the sum of the amount of the performance additives inclusive of viscosity index improver(s) and/or pour point depressant(s) and/or other top treat additives. For example, the oil of lubricating viscosity that may be present in a finished fluid may be a major amount, such as greater than about 50 wt. %, greater than about 60 wt. %, greater than about 70 wt. %, greater than about 80 wt. %, greater than about 85 wt. %, or greater than about 90 wt. %.

In certain embodiments, a particular selection of the base oil may provide advantageous results in reducing chain stretch or elongation. For example, in some embodiments, it may be desirable to select a base oil with an SAE Viscosity grade of either 0W or 5W. In certain embodiments, advantages may be attained by selecting a base oil with an SAE Viscosity grade of 0W-16 or 5W-30.

Detergents

The lubricant composition of the disclosure contains at least one overbased calcium sulfonate detergent. The at least one overbased calcium sulfonate can be derived from suitable aliphatic, cycloaliphatic, aromatic or heterocyclic sulfonic acids and/or the salts thereof. In general such acids can be represented by the formulas $R(SO_3H)_n$ and $(R')_xT(SO_3H)_y$, where R is an aliphatic or aliphatic-substituted cycloaliphatic group free from acetylenic unsaturation and having up to about 60 carbon atoms; n is at least one, and is generally in the range of 1 to 3; R is an aliphatic group free from acetylenic unsaturation (typically alkyl or alkenyl) and having about 4 to about 60 carbon atoms; T is a cyclic nucleus which may be derived from an aromatic hydrocarbon such as benzene, toluene, xylene, naphthalene, anthracene, biphenyl, etc., or from a heterocyclic compound such as pyridine, indole, isoindole, etc. Ordinarily T is an aromatic hydrocarbon nucleus such as benzene or naphthalene; and x and y have an average value of about 1 to 4 per molecule, most often an average of about 1. Examples of such acids are petroleum sulfonic acids, paraffin wax sulfonic acids, wax-substituted cyclohexyl sulfonic acids, cetylcyclopentyl sulfonic acids, wax-substituted aromatic sulfonic acids, mahogany sulfonic acids, tetraisobutylene sulfonic acids, tetraamylene sulfonic acids, and the like. Most preferably, the overbased calcium salts are formed from alkylaryl sulfonic acids, such as alkylbenzene sulfonic acids. The alkyl group or groups present on the aromatic ring typically each contain from about 8 to about 40 carbon atoms. Suitable overbased calcium sulfonates having total base numbers of at least about 150 milligrams of KOH per gram of the overbased composition are available as articles of commerce from a number of suppliers. One such material is HiTEC® 611 additive (Ethyl Petroleum Additives, Inc.) which has a nominal TBN of about 300 mg KOH/gram of the composition.

The lubricating oil composition may contain from about 1000 ppm to about 1800 ppm, or from about 1100 ppm to about 1600 ppm, or from about 1200 ppm to about 1500 ppm of calcium provided by the overbased calcium-containing detergent, based on a total weight of the lubricating oil composition. Also, in some embodiments the total amount of calcium in the lubricating oil composition from all sources may be from about 1000 ppm to about 1800 ppm. In some embodiments, the overbased calcium detergent comprises from about 0.9 wt. % to about 10 wt. %, or from about 1 wt. % to about 5 wt. %, or from about 1 wt. % to about 2 wt. % of the lubricating oil composition.

The lubricating oil composition of the disclosure may optionally include at least one or more additional detergents. The one or more additional detergents are preferably selected from a magnesium sulfonate detergent, and a neutral calcium sulfonate detergent. In some embodiments, the additional detergent is a magnesium sulfonate detergent.

The detergent component may optionally also include one or more other overbased calcium salts of at least one acidic organic compound. These include overbased calcium phenates, overbased calcium sulfur containing phenates, overbased calcium calixarates, overbased calcium salixarates, overbased calcium salicylates, overbased calcium carboxylic acids, overbased calcium phosphorus acids, overbased calcium mono- and/or di-thiophosphoric acids, overbased calcium alkyl phenols, overbased calcium sulfur coupled alkyl phenol compounds, and overbased calcium methylene bridged phenols.

The terminology "overbased" relates to metal salts, such as metal salts of sulfonates, carboxylates, and phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. Salts with an MR greater than one are commonly referred to as overbased, hyperbased, or superbased salts and may be salts of organic sulfur acids, carboxylic acids, or phenols.

The actual stoichiometric excess of metal in the overbased salt can vary considerably, for example, from about 0.1 equivalent to about 50 or more equivalents depending on the materials used, the reactions utilized, and the process conditions employed. Generally speaking, the overbased calcium salts useful in the lubricating oil compositions contain from about 1.1 to about 40 or more equivalents of calcium, more preferably from about 1.5 to about 30 and most preferably from about 2 to about 25 equivalents of calcium for each equivalent of material which is overbased.

Overbased calcium phenates are typically formed by overbasing calcium alkylphenates and/or calcium alkenylphenates where the aromatic ring is substituted with one or more alkyl or alkenyl groups (usually 1 to 2) that render the finished product soluble or at least stably dispersible in oil. The alkyl or alkenyl substituents on the aromatic ring typically contain at least about 6 carbon atoms and may contain as many as 500 or more carbon atoms. Preferred substituents are derived from alpha-olefins such as are formed by wax cracking or chain growth of ethylene on aluminum alkyls such as triethyl aluminum, or from olefin oligomers such as olefin dimers, trimers, tetramers and/or pentamers. However higher polymers such as polypropenes, polyisobutenes, polyamylenes, and copolymers such as copolymers of ethylene and propylene, etc., are also useful as source materials for forming the substituted phenols from which the calcium phenate is produced. In most cases the phenate will have an alkyl or alkenyl substituent having in the range of about 6 to about 50 carbon atoms. The phenolic ring may also additionally contain short chain substituents such as methyl, ethyl, isopropyl, butyl, etc. substituents. Likewise, the phenate may be a derivative of a polyhydroxy aromatic compound, such as catechol, resorcinol, or hydroquinone.

The overbased sulfurized calcium phenates can be formed from the substituted phenols described above by reacting the substituted phenol with sulfur monochloride, sulfur dichloride or elemental sulfur. The phenol:sulfur compound molar ratio is usually in the range of about 1:0.5 to about 1:1.5 or more. Reaction temperatures in the range of about 60 to about 200° C. are usually employed. Generally the phenol:sulfur group molar ratio in the sulfurized phenate is in the range of about 2:1 to about 1:2.

Suitable overbased carboxylic acids which can be used in the lubricating oil composition include overbased aliphatic carboxylic acids, overbased cycloaliphatic carboxylic acids, overbased aromatic carboxylic acids, and overbased heterocyclic carboxylic acids. Such acids can be monocarboxylic or polycarboxylic acids, and the principal requirement is that the acid have sufficient chain length to be soluble or at least stably dispersible in lubricating oil. Thus the acids generally contain from about 8 to about 50, and preferably from about 12 to about 30, carbon atoms, although certain acids such as alkyl- or alkenyl-substituted succinic acids can have an average of up to 500 or more carbon atoms per molecule. The acids are usually free of acetylenic unsaturation. Examples include linolenic acid, capric acid, linoleic acid, oleic acid, stearic acid, lauric acid, ricinoleic acid, undecylic acid, palmitoleic acid, 2-ethylhexanoic acid, myristic acid, isostearic acid, behenic acid, pelargonic acid, propylene tetramer-substituted succinic acid, isobutene trimer-substituted succinic acid, octylcyclopentane carboxylic acid, stearyl-octahydroindenecarboxylic acid, tall oil acids, rosin acids, polybutenyl succinic acids derived from polybutene having a GPC number average molecular weight in the range of 200 to 1500, acids formed by oxidation of wax, and like acids.

The additive package and lubricant composition of the present disclosure may also include one or more additional overbased detergents other than calcium detergents. Suitable additional overbased detergents include overbased magnesium phenates, overbased magnesium sulfur containing phenates, overbased magnesium sulfonates, overbased magnesium calixarates, overbased magnesium salixarates, overbased magnesium salicylates, overbased magnesium carboxylic acids, overbased magnesium phosphorus acids, overbased magnesium mono- and/or di-thiophosphoric acids, overbased magnesium alkyl phenols, overbased magnesium sulfur coupled alkyl phenol compounds, or overbased magnesium methylene bridged phenols. The preferred overbased magnesium salts are overbased magnesium alkylbenzene sulfonate detergent compositions having a total base number of at least about 300 milligrams of KOH per gram thereof, and most preferably a total base number in the range of about 350 to about 500 milligrams of KOH per gram thereof. Since such compositions are formed in an inert diluent, usually a mineral oil diluent, the total base number reflects the basicity of the overall composition including diluent, and any other materials (e.g., promoter, etc.) that may be contained in the detergent composition.

The overbased detergents may have a metal to substrate ratio of from 1.1:1, or from 2:1, or from 4:1, or from 5:1, or from 7:1, or from 10:1.

The lubricant composition of the disclosure may also optionally include one or more neutral or low based detergents or mixtures thereof. Low based detergents are detergents with a TBN of greater than 0 up to less that 150 mg KOH/gram of composition.

Suitable low base calcium alkylbenzene sulfonate detergent compositions, most preferably low base calcium propylene-derived alkylaryl sulfonates are formed by preparing an alkali or alkaline earth metal salt of an alkylbenzene sulfonic acid and if desired, subjecting the salt in the presence of a small excess of an alkali or alkaline earth metal base such as an oxide, hydroxide or alcoholate to the action of an acidic material such as carbon dioxide so that a small amount of overbasing occurs. This controlled overbasing can be conducted using the same materials in much the same way as the overbasing described above, except of course the amount of metal base is such that the desired total base number of the resultant composition is achieved. Suitable low base materials of the foregoing types are available as articles of commerce. HiTEC® 614 additive (Ethyl Petroleum Additives, Inc.) is a good example of a commercially-available calcium alkylbenzene sulfonate. Low-base calcium sulfurized alkylphenates are also suitable components in the compositions of this disclosure.

The total amount of detergent that may be present in the lubricating oil composition may be about 0 wt. % to about 10 wt. %, or about 0.1 wt. % to about 8 wt. %, or about 1 wt. % to about 4 wt. %, or greater than about 4 wt. % to about 8 wt. %.

Antiwear Agents

The lubricating oil compositions of the present disclosure contain one or more metal dialkyl dithiophosphate antiwear agents. The metal in the dialkyl dithiophosphate salts may be an alkali metal, alkaline earth metal, aluminum, lead, tin, molybdenum, manganese, nickel, copper, titanium, or zinc. A particularly useful metal dialkyl dithiophosphate salt may be zinc dialkyl dithiophosphate.

Zinc dialkyl dithiophosphates (ZDDP) are oil soluble salts of dialkyl dithiophosphoric acids and may be represented by the following formula:

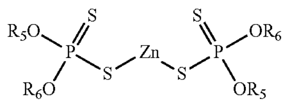

wherein $R_5$ and $R_6$ may be the same or different alkyl and/or cycloalkyl groups containing from 1 to 18 carbon atoms, or 2 to 12 carbon atoms, or 2 to 8 carbon atoms. Thus, the alkyl and/or cycloalkyl groups may be, for example, ethyl, n-propyl, i-propyl, n-butyl, i-butyl, sec-butyl, amyl, n-hexyl, i-hexyl, n-octyl, decyl, dodecyl, octadecyl, 2-ethylhexyl, cyclohexyl, methylcyclopentyl, propenyl, or butenyl.

The dialkyl dithiophosphate metal salts may be prepared in accordance with known techniques by first forming a dialkyl dithiophosphoric acid (DDPA), usually by reaction of one or more alcohols and then neutralizing the formed DDPA with a metal compound. To make the metal salt, any basic or neutral metal compound could be used but the oxides, hydroxides, and carbonates are most generally employed. The zinc dialkyl dithiophosphates of component (i) may be made by a process such as the process generally described in U.S. Pat. No. 7,368,596.

In some embodiments, the at least one metal dialkyl dithiophosphate salt may be present in the lubricating oil in an amount sufficient to provide from about 100 to about 1000 ppm phosphorus, or from about 200 to about 1000 ppm phosphorus, or from about 300 to about 900 ppm phosphorus, or from about 400 to about 800 ppm phosphorus, or from about 550 to about 700 ppm phosphorus.

In some embodiments, the metal dialkyl dithiophosphate salt may be zinc dialkyl dithiophosphate (ZDDP). In some embodiments, the additive package may comprise two or more metal dialkyl dithiophosphate salts and one, two, or all is ZDDP. The zinc dialkyl dithiophosphate may deliver from about 700 ppm to about 900 ppm of zinc to the lubricating oil composition.

The lubricating oil compositions of the present disclosure may also optionally contain one or more additional antiwear agents. Examples of suitable additional antiwear agents include, but are not limited to, a metal thiophosphate; a phosphoric acid ester or salt thereof; a phosphate ester(s); a phosphite; a phosphorus-containing carboxylic ester, ether, or amide; a sulfurized olefin; thiocarbamate-containing compounds including, thiocarbamate esters, alkylene-coupled thiocarbamates, and bis(S-alkyldithiocarbamyl)disulfides; and mixtures thereof. The phosphorus containing antiwear agents are more fully described in European Patent 612 839. The metal may be an alkali metal, alkaline earth metal, aluminum, lead, tin, molybdenum, manganese, nickel, copper, titanium, or zinc.

Further examples of suitable additional antiwear agents include titanium compounds, tartrates, tartrimides, oil soluble amine salts of phosphorus compounds, sulfurized olefins, phosphites (such as dibutyl phosphite), phosphonates, thiocarbamate-containing compounds, such as thiocarbamate esters, thiocarbamate amides, thiocarbamic ethers, alkylene-coupled thiocarbamates, and bis(S-alkyldithiocarbamyl) disulfides. The tartrate or tartrimide may contain alkyl-ester groups, where the sum of carbon atoms on the alkyl groups may be at least 8. The antiwear agent may in one embodiment include a citrate.

The antiwear agent may be present in ranges including about 0.2 wt. % to about 15 wt. %, or about 0.01 wt. % to about 10 wt. %, or about 0.05 wt. % to about 5 wt. %, or about 0.1 wt. % to about 3 wt. % of the lubricating composition.

Dispersants

The lubricating oil composition of the present disclosure includes at least one borated dispersant. Preferably, the amount of the at least one borated dispersant in the lubricating oil composition is sufficient to deliver a total ppm of boron in the lubricating oil to provide a weight ratio of ppm metal from the detergent to the total ppm of boron in the lubricating oil composition of from about 5.7 to about 8.5 or from about 5.7 to about 6.5.

The borated dispersant may be an ashless dispersant. Typical ashless dispersants include N-substituted long chain alkenyl succinimides. Examples of N-substituted long chain alkenyl succinimides include polyisobutylene succinimide with number average molecular weight of the polyisobutylene substituent in the range about 350 to about 50,000, or to about 5,000, or to about 3,000. Succinimide dispersants and their preparation are disclosed, for instance in U.S. Pat. No. 7,897,696 or 4,234,435. The polyolefin may be prepared from polymerizable monomers containing about 2 to about 16, or about 2 to about 8, or about 2 to about 6 carbon atoms. Succinimide dispersants are typically the imide formed from a polyamine, typically a poly(ethyleneamine).

In an embodiment the lubricating oil composition comprises at least one borated polyisobutylene succinimide dispersant derived from polyisobutylene with number average molecular weight in the range about 350 to about 50,000, or to about 5000, or to about 3000. The borated polyisobutylene succinimide may be used alone or in combination with other dispersants.

In some embodiments, polyisobutylene, when included, may have greater than 50 mol %, greater than 60 mol %, greater than 70 mol %, greater than 80 mol %, or greater than 90 mol % content of terminal double bonds. Such PIB is also referred to as highly reactive PIB ("HR-PIB"). HR-PIB having a number average molecular weight ranging from about 800 to about 5000 is suitable for use in embodiments of the present disclosure. Conventional PIB typically has less than 50 mol %, less than 40 mol %, less than 30 mol %, less than 20 mol %, or less than 10 mol % content of terminal double bonds.

An HR-PIB having a number average molecular weight ranging from about 900 to about 3000 may be suitable. Such HR-PIB is commercially available, or can be synthesized by the polymerization of isobutene in the presence of a non-chlorinated catalyst such as boron trifluoride, as described in U.S. Pat. No. 4,152,499 to Boerzel, et al. and U.S. Pat. No. 5,739,355 to Gateau, et al. When used in the aforementioned thermalene reaction, HR-PIB may lead to higher conversion rates in the reaction, as well as lower amounts of sediment formation, due to increased reactivity. A suitable method is described in U.S. Pat. No. 7,897,696.

The borated dispersant may be derived from polyisobutylene succinic anhydride ("PIBSA"). The PIBSA may have an average of between about 1.0 and about 2.0 succinic acid moieties per polymer.

In one embodiment the lubricating oil composition includes at least one borated dispersant, wherein the dispersant is the reaction product of an olefin copolymer or a reaction product of an olefin copolymer with succinic anhydride, and at least one polyamine. The ratio of PIBSA: polyamine may be from 1:1 to 10:1, preferably, 1:1 to 5:1, or 4:3 to 3:1 or 4:3 to 2:1. A particularly useful dispersant contains a polyisobutenyl group of the PIBSA having a number average molecular weight (Mn) in the range of from about 500 to 5000 as determined by GPC using polystyrene as a calibration reference and a (B) polyamine having a general formula $H_2N(CH_2)m-[NH(CH_2)_m]_n—NH_2$, wherein m is in the range from 2 to 4 and n is in the range of from 1 to 2.

In addition to boration, the dispersant may be post-treated with an aromatic carboxylic acid, an aromatic polycarboxylic acid, or an aromatic anhydride wherein all carboxylic acid or anhydride group(s) are attached directly to an aromatic ring. Such carboxyl-containing aromatic compounds may be selected from 1,8-naphthalic acid or anhydride and 1,2-naphthalenedicarboxylic acid or anhydride, 2,3-naphthalenedicarboxylic acid or anhydride, naphthalene-1,4-dicarboxylic acid, naphthalene-2,6-dicarboxylic acid, phthalic anhydride, pyromellitic anhydride, 1,2,4-benzene tricarboxylic acid anhydride, diphenic acid or anhydride, 2,3-pyridine dicarboxylic acid or anhydride, 3,4-pyridine dicarboxylic acid or anhydride, 1,4,5,8-naphthalenetetracarboxylic acid or anhydride, perylene-3,4, 9,10-tetracarboxylic anhydride, pyrene dicarboxylic acid or anhydride, and the like. The moles of this post-treatment component reacted per mole of the polyamine may range from about 0.1:1 to about 2:1. A typical molar ratio of this post-treatment component to polyamine in the reaction mixture may range from about 0.2:1 to about 2:1. Another molar ratio of this post-treatment component to the polyamine that may be used may range from 0.25:1 to about 1.5:1. This post-treatment component may be reacted with the other components at a temperature ranging from about 140° to about 180° C.

Alternatively, or in addition to the post-treatment described in the previous paragraph, the borated dispersant may be post-treated with a non-aromatic dicarboxylic acid or anhydride. The non-aromatic dicarboxylic acid or anhydride of may have a number average molecular weight of less than 500. Suitable carboxylic acids or anhydrides thereof may include, but are not limited to acetic acid or anhydride, oxalic acid and anhydride, malonic acid and anhydride, succinic acid and anhydride, alkenyl succinic acid and anhydride, glutaric acid and anhydride, adipic acid and anhydride, pimelic acid and anhydride, suberic acid and anhydride, azelaic acid and anhydride, sebacic acid and anhydride, maleic acid and anhydride, fumaric acid and anhydride, tartaric acid and anhydride, glycolic acid and anhydride, 1,2,3,6-tetrahydronaphthalic acid and anhydride, and the like.

The non-aromatic carboxylic acid or anhydride is reacted at a molar ratio with the polyamine ranging from about 0.1 to about 2.5 moles per mole of polyamine Typically, the amount of non-aromatic carboxylic acid or anhydride used will be relative to the number of secondary amino groups in the polyamine. Accordingly, from about 0.2 to about 2.0 moles of the non-aromatic carboxylic acid or anhydride per secondary amino group in Component B may be reacted with the other components to provide the dispersant according to embodiments of the disclosure. Another molar ratio of the non-aromatic carboxylic acid or anhydride to polyamine that may be used may range from 0.25:1 to about 1.5:1 moles of per mole of polyamine. The non-aromatic carboxylic acid or anhydride may be reacted with the other components at a temperature ranging from about 140° to about 180° C.

The post-treatment step may be carried out upon completion of the reaction of the olefin copolymer with succinic anhydride, and at least one polyamine. In certain embodiments, the borated dispersant is post treated with maleic anhydride and/or naphthalic anhydride and, in these embodiments, the lubricating oil composition may have a molybdenum content of at least 80 ppm or at least 100 ppm or at least 150 ppm The % actives of the alkenyl or alkyl succinic anhydride can be determined using a chromatographic technique. This method is described in column 5 and 6 in U.S. Pat. No. 5,334,321. The percent conversion of the polyolefin is calculated from the % actives using the equation in column 5 and 6 in U.S. Pat. No. 5,334,321.

In one embodiment, the borated dispersant may be derived from a polyalphaolefin (PAO) succinic anhydride.

In one embodiment, the borated dispersant may be derived from olefin maleic anhydride copolymer. As an example, the borated dispersant may be described as a poly-PIBSA.

In an embodiment, the borated dispersant may be derived from an anhydride which is grafted to an ethylene-propylene copolymer.

One class of suitable dispersants for use as the borated dispersant may be borated Mannich bases. Mannich bases are materials that are formed by the condensation of a higher molecular weight, alkyl substituted phenol, a polyalkylene polyamine, and an aldehyde such as formaldehyde. Mannich bases are described in more detail in U.S. Pat. No. 3,634,515.

A suitable class of borated dispersants may also include high molecular weight esters or half ester amides.

A suitable borated dispersant may also be post-treated by conventional methods by a reaction with any of a variety of agents. Among these are urea, thiourea, dimercaptothiadiazoles, carbon disulfide, aldehydes, ketones, carboxylic acids, hydrocarbon-substituted succinic anhydrides, maleic anhydride, nitriles, epoxides, carbonates, cyclic carbonates, hindered phenolic esters, and phosphorus compounds. U.S. Pat. Nos. 7,645,726; 7,214,649; and 8,048,831 describe suitable post-treatment compounds and methods.

In addition to the post-treatment used to borate the borated dispersant, the borated dispersant may also be post-treated, or further post-treated, with a variety of post-treatments designed to improve or impart different properties. Such post-treatments include those summarized in columns 27-29 of U.S. Pat. No. 5,241,003. Such treatments include, treatment with:

Inorganic phosphorous acids or anhydrates (e.g., U.S. Pat. Nos. 3,403,102 and 4,648,980); Organic phosphorous compounds (e.g., U.S. Pat. No. 3,502,677);

Phosphorous pentasulfides;

Boron compounds as already noted above (e.g., U.S. Pat. Nos. 3,178,663 and 4,652,387);

Carboxylic acid, polycarboxylic acids, anhydrides and/or acid halides (e.g., U.S. Pat. Nos. 3,708,522 and 4,948,386);

Epoxides polyepoxiates or thioexpoxides (e.g., U.S. Pat. Nos. 3,859,318 and 5,026,495);

Aldehyde or ketone (e.g., U.S. Pat. No. 3,458,530);

Carbon disulfide (e.g., U.S. Pat. No. 3,256,185);

Glycidol (e.g., U.S. Pat. No. 4,617,137);

Urea, thourea or guanidine (e.g., U.S. Pat. Nos. 3,312,619; 3,865,813; and British Patent GB 1,065,595);

Organic sulfonic acid (e.g., U.S. Pat. No. 3,189,544 and British Patent GB 2,140,811);

Alkenyl cyanide (e.g., U.S. Pat. Nos. 3,278,550 and 3,366,569);

Diketene (e.g., U.S. Pat. No. 3,546,243);

A diisocyanate (e.g., U.S. Pat. No. 3,573,205);

Alkane sultone (e.g., U.S. Pat. No. 3,749,695);

1,3-Dicarbonyl Compound (e.g., U.S. Pat. No. 4,579,675);

Sulfate of alkoxylated alcohol or phenol (e.g., U.S. Pat. No. 3,954,639);

Cyclic lactone (e.g., U.S. Pat. Nos. 4,617,138; 4,645,515; 4,668,246; 4,963,275; and 4,971,711);

Cyclic carbonate or thiocarbonate linear monocarbonate or polycarbonate, or chloroformate (e.g., U.S. Pat. Nos. 4,612,132; 4,647,390; 4,648,886; 4,670,170);

Nitrogen-containing carboxylic acid (e.g., U.S. Pat. No. 4,971,598 and British Patent GB 2,140,811);

Hydroxy-protected chlorodicarbonyloxy compound (e.g., U.S. Pat. No. 4,614,522);

Lactam, thiolactam, thiolactone or ditholactone (e.g., U.S. Pat. Nos. 4,614,603 and 4,666,460);

Cyclic carbonate or thiocarbonate, linear monocarbonate or plycarbonate, or chloroformate (e.g., U.S. Pat. Nos. 4,612,132; 4,647,390; 4,646,860; and 4,670,170);

Nitrogen-containing carboxylic acid (e.g., U.S. Pat. No. 4,971,598 and British Patent GB 2,440,811);

Hydroxy-protected chlorodicarbonyloxy compound (e.g., U.S. Pat. No. 4,614,522);

Lactam, thiolactam, thiolactone or dithiolactone (e.g., U.S. Pat. Nos. 4,614,603, and 4,666,460);

Cyclic carbamate, cyclic thiocarbamate or cyclic dithiocarbamate (e.g., U.S. Pat. Nos. 4,663,062 and 4,666,459);

Hydroxyaliphatic carboxylic acid (e.g., U.S. Pat. Nos. 4,482,464; 4,521,318; 4,713,189); Oxidizing agent (e.g., U.S. Pat. No. 4,379,064);

Combination of phosphorus pentasulfide and a polyalkylene polyamine (e.g., U.S. Pat. No. 3,185,647);

Combination of carboxylic acid or an aldehyde or ketone and sulfur or sulfur chloride (e.g., U.S. Pat. Nos. 3,390,086; 3,470,098);

Combination of a hydrazine and carbon disulfide (e.g. U.S. Pat. No. 3,519,564);

Combination of an aldehyde and a phenol (e.g., U.S. Pat. Nos. 3,649,229; 5,030,249; 5,039,307);

Combination of an aldehyde and an O-diester of dithiophosphoric acid (e.g., U.S. Pat. No. 3,865,740);

Combination of a hydroxyaliphatic carboxylic acid and a boric acid (e.g., U.S. Pat. No. 4,554,086);

Combination of a hydroxyaliphatic carboxylic acid, then formaldehyde and a phenol (e.g., U.S. Pat. No. 4,636,322);

Combination of a hydroxyaliphatic carboxylic acid and then an aliphatic dicarboxylic acid (e.g., U.S. Pat. No. 4,663,064);

Combination of formaldehyde and a phenol and then glycolic acid (e.g., U.S. Pat. No. 4,699,724);

Combination of a hydroxyaliphatic carboxylic acid or oxalic acid and then a diisocyanate (e.g. U.S. Pat. No. 4,713,191);

Combination of inorganic acid or anhydride of phosphorus or a partial or total sulfur analog thereof and a boron compound (e.g., U.S. Pat. No. 4,857,214);

Combination of an organic diacid then an unsaturated fatty acid and then a nitrosoaromatic amine optionally followed by a boron compound and then a glycolating agent (e.g., U.S. Pat. No. 4,973,412);

Combination of an aldehyde and a triazole (e.g., U.S. Pat. No. 4,963,278);

Combination of an aldehyde and a triazole then a boron compound (e.g., U.S. Pat. No. 4,981,492);

Combination of cyclic lactone and a boron compound (e.g., U.S. Pat. No. 4,963,275 and The TBN of a suitable borated dispersant may be from about 10 to about 65 mg KOH/gram composition on an oil-free basis, which is comparable to about 5 to about 30 mg KOH/gram composition TBN if measured on a dispersant sample containing about 50% diluent oil.

The borated dispersant can be used in an amount sufficient to provide up to about 20 wt. %, based upon the final weight of the lubricating oil composition. Other amounts of the borated dispersant that can be used may be about 0.1 wt. % to about 15 wt. %, or about 0.1 wt. % to about 10 wt. %, or about 3 wt. % to about 10 wt. %, or about 1 wt. % to about 6 wt. %, or about 7 wt. % to about 12 wt. %, based upon the final weight of the lubricating oil composition. In some embodiments, the lubricating oil composition utilizes a mixed dispersant system. A single type or a mixture of two or more types of dispersants in any desired ratio may be used.

The lubricant composition may optionally further comprise one or more additional dispersants or mixtures thereof. The additional dispersants may be selected from non-borated versions of any one or more of the borated dispersants discussed above. In some embodiments, the total dispersant may comprise up to about 20 wt. %, based upon the total weight of the lubricating oil composition. Other amounts of the total dispersant that can be used may be about 0.1 wt. % to about 15 wt. %, or about 0.1 wt. % to about 10 wt. %, or about 3 wt. % to about 10 wt. %, or about 1 wt. % to about 6 wt. %, or about 7 wt. % to about 12 wt. %, based upon the total weight of the lubricating oil composition.

The weight ratio of nitrogen from the dispersant in the lubricating oil composition to the total boron in the lubricating oil composition is from about 2.6 to about 3.0.

Molybdenum-Containing Component

The lubricating oil compositions of the present disclosure contain one or more molybdenum-containing compounds. An oil-soluble molybdenum compound may have the functional performance of an antiwear agent, an antioxidant, a friction modifier, or mixtures thereof. An oil-soluble molybdenum compound may include molybdenum dithiocarbamates, molybdenum dialkyldithiophosphates, molybdenum dithiophosphinates, amine salts of molybdenum compounds, molybdenum xanthates, molybdenum thioxanthates, molybdenum sulfides, molybdenum carboxylates, molybdenum alkoxides, a trinuclear organo-molybdenum compound, and/or mixtures thereof. The molybdenum sulfides include molybdenum disulfide. The molybdenum disulfide may be in the form of a stable dispersion. In one embodiment the oil-soluble molybdenum compound may be selected from the group consisting of molybdenum dithiocarbamates, molybdenum dialkyldithiophosphates, amine salts of molybdenum compounds, and mixtures thereof. In one embodiment the oil-soluble molybdenum compound may be a molybdenum dithiocarbamate.

Suitable examples of molybdenum compounds which may be used include commercial materials sold under the trade names such as Molyvan 822™, Molyvan™ A, Molyvan 2000™ and Molyvan 855™ from R. T. Vanderbilt Co., Ltd., and Sakura-Lube™ S-165, S-200, S-300, 5-310G, S-525, S-600, S-700, and S-710 available from Adeka Corporation, and mixtures thereof. Suitable molybdenum components are described in U.S. Pat. No. 5,650,381; U.S. Pat. No. RE 37,363 E1; U.S. Pat. No. RE 38,929 E1; and U.S. Pat. No. RE 40,595 E1.

Additionally, the molybdenum compound may be an acidic molybdenum compound. Included are molybdic acid, ammonium molybdate, sodium molybdate, potassium molybdate, and other alkaline metal molybdates and other molybdenum salts, e.g., hydrogen sodium molybdate, MoOCl4, MoO2Br2, Mo2O3Cl6, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897.

Another class of suitable organo-molybdenum compounds are trinuclear molybdenum compounds, such as those of the formula Mo3SkLnQz and mixtures thereof, wherein S represents sulfur, L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685.

The oil-soluble molybdenum compound may be present in an amount sufficient to provide about 80 ppm to about 2000 ppm, about 150 ppm to about 800 ppm, about 100 ppm to about 600 ppm, about 150 ppm to about 550 ppm of molybdenum to the lubricating oil composition. In another embodiment, the molybdenum compound may be present in an amount sufficient to provide about 100 ppm to about 1000 ppm, or about 150 ppm to about 600 ppm of molybdenum to the lubricating oil composition. In certain embodiments of the present disclosure, the lubricating oil composition may contain at least 600 ppm of molybdenum when the base oil has a viscosity grade of 0W-16, a boron content of at least 200 ppm and a sulfur content of no greater than 2550. In some embodiments of the present invention, the lubricating oil composition contains greater than 80 ppm of molybdenum and has a weight ratio of boron to nitrogen in the lubricating oil composition of less than 1.0.

The Lubricating Oil Composition

In one embodiment, the lubricating oil composition used in the methods of the present invention has wherein the lubricating oil composition has a TBN value of at least 7.5 mg KOH/gram lubricating oil composition, determined using the method of ASTM-2896, at least 80 ppm of molybdenum based on a total weight of the lubricating oil composition, a weight ratio of total calcium in the lubricating oil composition to total molybdenum in the lubricating oil composition of less than 8.4; and a weight ratio of nitrogen from the dispersant in the lubricating composition to total boron in the lubricating oil composition of from 2.6 to 3.0.

In some embodiments of the invention, the lubricating oil composition has a weight ratio of total sulfur in the lubricating composition to total molybdenum in the lubricating composition of from about 1:1 to about 17:1 or from about 4:1 to about 17:1.

In some embodiments, the lubricating oil composition may have a boron content no greater than 310 ppm.

In certain embodiments of the present disclosure, the lubricating composition has a TBN value of at least 7.5 mg KOH/gram of lubricating oil composition.

In certain embodiments of the present disclosure, the base oil component of the lubricating oil composition may have an SAE viscosity grade of 5W and the lubricating oil composition has a ratio of total ppm of boron in the lubricating oil composition to the TBN of total detergent in the lubricating oil composition of from about 45 to about 63, or from about 50 to about 63 or from about 56 to about 63.

In some embodiments the base oil component of the lubricating oil composition may have a viscosity grate of 5W-30 and the lubricating oil composition has a molybdenum content greater than 150 ppm.

The lubricating oil composition may have a weight ratio of total boron in the lubricating oil composition to total nitrogen in the lubricating oil composition of less than 1.0.

In certain alternative embodiments of the invention, the dispersant may contain a reaction product of an olefin copolymer with at least one polyamine or a reaction product of an olefin copolymer with a succinic anhydride, and at least one polyamine, wherein the reaction product is post-treated with an aromatic carboxylic acid, an aromatic polycarboxylic acid, or an aromatic anhydride wherein all carboxylic acid or anhydride groups are attached directly to an aromatic ring, and with a non-aromatic dicarboxylic acid or anhydride having a number average molecular weight of less than 500.

In certain embodiments of the invention, the base oil has a viscosity grade of 0W-16, and the lubricating oil composition has a total boron content of at least 200 ppm, a total molybdenum content of at least 600 ppm, and a total sulfur content of no greater than about 2550 ppm.

The lubricating oil composition may have a Noack volatility of less than 20 mass % or less than 15 mass % or less than 13 mass %.

Optional Additives

Antioxidants

The lubricating oil compositions herein also may optionally contain one or more antioxidants. Antioxidant compounds are known and include for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidant compounds may be used alone or in combination.

The hindered phenol antioxidant may contain a secondary butyl and/or a tertiary butyl group as a sterically hindering group. The phenol group may be further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant may be an ester and may include, e.g., Irganox™ L-135 available from BASF or an addition product derived from 2,6-di-tert-butylphenol and an alkyl acrylate, wherein the alkyl group may contain about 1 to about 18, or about 2 to about 12, or about 2 to about 8, or about 2 to about 6, or about 4 carbon atoms. Another commercially available hindered phenol antioxidant may be an ester and may include Ethanox™ 4716 available from Albemarle Corporation.

Useful antioxidants may include diarylamines and high molecular weight phenols. In an embodiment, the lubricating oil composition may contain a mixture of a diarylamine and a high molecular weight phenol, such that each antioxidant may be present in an amount sufficient to provide up to about 5%, by weight, based upon the final weight of the lubricating oil composition. In an embodiment, the antioxidant may be a mixture of about 0.3 to about 1.5% diarylamine and about 0.4 to about 2.5% high molecular weight phenol, by weight, based upon the final weight of the lubricating oil composition.

Examples of suitable olefins that may be sulfurized to form a sulfurized olefin include propylene, butylene, isobutylene, polyisobutylene, pentene, hexene, heptene, octene, nonene, decene, undecene, dodecene, tridecene, tetradecene, pentadecene, hexadecene, heptadecene, octadecene, nonadecene, eicosene or mixtures thereof. In one embodiment, hexadecene, heptadecene, octadecene, nonadecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes sulfurized fatty acids and their esters. The fatty acids are often obtained from vegetable oil or animal oil and typically contain about 4 to about 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. Fatty acids and/or ester may be mixed with olefins, such as α-olefins.

The one or more antioxidant(s) may be present in ranges about 0 wt. % to about 20 wt. %, or about 0.1 wt. % to about 10 wt. %, or about 1 wt. % to about 5 wt. %, of the lubricating composition.

Extreme Pressure Agents

The lubricating oil compositions herein also may optionally contain one or more extreme pressure agents. Extreme Pressure (EP) agents that are soluble in the oil include sulfur- and chlorosulfur-containing EP agents, chlorinated hydrocarbon EP agents and phosphorus EP agents. Examples of such EP agents include chlorinated wax; organic sulfides and polysulfides such as dibenzyldisulfide, bis(chlorobenzyl) disulfide, dibutyl tetrasulfide, sulfurized methyl ester of oleic acid, sulfurized alkylphenol, sulfurized dipentene, sulfurized terpene, and sulfurized Diels-Alder adducts; phosphosulfurized hydrocarbons such as the reaction product of phosphorus sulfide with turpentine or methyl oleate; phosphorus esters such as the dihydrocarbyl and trihydrocarbyl phosphites, e.g., dibutyl phosphite, diheptyl phosphite, dicyclohexyl phosphite, pentylphenyl phosphite; dipentylphenyl phosphite, tridecyl phosphite, distearyl phosphite and polypropylene substituted phenyl phosphite; metal thiocarbamates such as zinc dioctyldithiocarbamate and barium heptylphenol diacid; amine salts of alkyl and dialkylphosphoric acids, including, for example, the amine salt of the reaction product of a dialkyldithiophosphoric acid with propylene oxide; and mixtures thereof.

Friction Modifiers

The lubricating oil compositions herein also may optionally contain one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanadine, alkanolamides, phosphonates, metal-containing compounds, glycerol esters, sulfurized fatty compounds and olefins, sunflower oil other naturally occurring plant or animal oils, dicarboxylic acid esters, esters or partial esters of a polyol and one or more aliphatic or aromatic carboxylic acids, and the like.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In some embodiments the friction modifier may be a long chain fatty acid ester. In another embodiment the long chain fatty acid ester may be a mono-ester, or a di-ester, or a (tri)glyceride. The friction modifier may be a long chain fatty amide, a long chain fatty ester, a long chain fatty epoxide derivatives, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291.

A friction modifier may optionally be present in ranges such as about 0 wt. % to about 10 wt. %, or about 0.01 wt. % to about 8 wt. %, or about 0.1 wt. % to about 4 wt. %.

Boron-Containing Compounds

The lubricating oil compositions herein may optionally contain one or more boron-containing compounds other than the borated dispersant discussed above.

Examples of boron-containing compounds include borate esters, borated fatty amines, borated epoxides, and borated detergents.

The additional boron-containing compound, if present, can be used in an amount sufficient to provide up to about 8 wt. %, about 0.01 wt. % to about 7 wt. %, about 0.05 wt. % to about 5 wt. %, or about 0.1 wt. % to about 3 wt. % of the lubricating composition.

Titanium-Containing Compounds

Another class of optional additives that may be used in the lubricating oil compositions of the invention is oil-soluble titanium compounds. The oil-soluble titanium compounds may function as antiwear agents, friction modifiers, antioxidants, deposit control additives, or more than one of these functions. In an embodiment the oil soluble titanium compound may be a titanium (IV) alkoxide. The titanium alkoxide may be formed from a monohydric alcohol, a polyol, or mixtures thereof. The monohydric alkoxides may have 2 to 16, or 3 to 10 carbon atoms. In an embodiment, the titanium alkoxide may be titanium (IV) isopropoxide. In an embodiment, the titanium alkoxide may be titanium (IV) 2-ethylhexoxide. In an embodiment, the titanium compound may be the alkoxide of a 1,2-diol or polyol. In an embodiment, the 1,2-diol comprises a fatty acid mono-ester of glycerol, such as oleic acid. In an embodiment, the oil soluble titanium compound may be a titanium carboxylate. In an embodiment the titanium (IV) carboxylate may be titanium neodecanoate.

In an embodiment the oil soluble titanium compound may be present in the lubricating composition in an amount to provide from zero to about 1500 ppm titanium by weight or about 10 ppm to 500 ppm titanium by weight or about 25 ppm to about 150 ppm titanium by weight.

Viscosity Index Improvers

The lubricating oil compositions herein also may optionally contain one or more viscosity index improvers. Suitable viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, polymethacrylates, polyacrylates, polyalkyl styrenes, hydrogenated alkenyl aryl conjugated diene copolymers, or mixtures thereof. Viscosity index improvers may include star polymers and suitable examples are described in US Publication No. 20120101017A1.

The lubricating oil compositions herein also may optionally contain one or more dispersant viscosity index improvers in addition to a viscosity index improver or in lieu of a viscosity index improver. Suitable viscosity index improvers may include functionalized polyolefins, for example, ethylene-propylene copolymers that have been functionalized with the reaction product of an acylating agent (such as maleic anhydride) and an amine; polymethacrylates functionalized with an amine, or esterified maleic anhydride-styrene copolymers reacted with an amine.

The total amount of viscosity index improver and/or dispersant viscosity index improver may be about 0 wt. % to about 20 wt. %, about 0.1 wt. % to about 15 wt. %, about 0.1 wt. % to about 12 wt. %, or about 0.5 wt. % to about 10 wt. %, of the lubricating composition.

Other Optional Additives

Other additives may be selected to perform one or more functions required of a lubricating fluid. Further, one or more of the mentioned additives may be multi-functional and provide functions in addition to or other than the function prescribed herein.

A lubricating composition according to the present disclosure may optionally comprise other performance additives. The other performance additives may be in addition to specified additives of the present disclosure and/or may comprise one or more of metal deactivators, viscosity index improvers, detergents, ashless TBN boosters, friction modifiers, antiwear agents, corrosion inhibitors, rust inhibitors, dispersants, dispersant viscosity index improvers, extreme pressure agents, antioxidants, foam inhibitors, demulsifiers, emulsifiers, pour point depressants, seal swelling agents and mixtures thereof. Typically, fully-formulated lubricating oil will contain one or more of these performance additives.

Suitable metal deactivators may include derivatives of benzotriazoles (typically tolyltriazole), dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides.

Suitable foam inhibitors include silicon-based compounds, such as siloxane.

Suitable pour point depressants may include a polymethylmethacrylates or mixtures thereof. Pour point depressants may be present in an amount sufficient to provide from about 0 wt. % to about 1 wt. %, about 0.01 wt. % to about 0.5 wt. %, or about 0.02 wt. % to about 0.04 wt. % based upon the final weight of the lubricating oil composition.

Suitable rust inhibitors may be a single compound or a mixture of compounds having the property of inhibiting corrosion of ferrous metal surfaces. Non-limiting examples of rust inhibitors useful herein include oil-soluble high molecular weight organic acids, such as 2-ethylhexanoic acid, lauric acid, myristic acid, palmitic acid, oleic acid, linoleic acid, linolenic acid, behenic acid, and cerotic acid, as well as oil-soluble polycarboxylic acids including dimer and trimer acids, such as those produced from tall oil fatty acids, oleic acid, and linoleic acid. Other suitable corrosion inhibitors include long-chain alpha, omega-dicarboxylic acids in the molecular weight range of about 600 to about 3000 and alkenylsuccinic acids in which the alkenyl group contains about 10 or more carbon atoms such as, tetrapropenylsuccinic acid, tetradecenylsuccinic acid, and hexadecenylsuccinic acid. Another useful type of acidic corrosion inhibitors are the half esters of alkenyl succinic acids having about 8 to about 24 carbon atoms in the alkenyl group with alcohols such as the polyglycols. The corresponding half amides of such alkenyl succinic acids are also useful. A useful rust inhibitor is a high molecular weight organic acid. In some embodiments, an lubricating oil is devoid of a rust inhibitor.

The rust inhibitor, if present, can be used in an amount sufficient to provide about 0 wt. % to about 5 wt. %, about 0.01 wt. % to about 3 wt. %, about 0.1 wt. % to about 2 wt. %, based upon the final weight of the lubricating oil composition.

In general terms, a suitable lubricant may include additive components in the ranges listed in Table 1.

TABLE 1

| Component | Wt. % (Suitable Embodiments) | Wt. % (Suitable Embodiments) |
|---|---|---|
| Dispersant(s) | 0.1-10.0 | 1.0-8.0 |
| Antioxidant(s) | 0.1-5.0 | 0.01-3.0 |
| Detergent(s) | 0.1-15.0 | 0.2-8.0 |
| Ashless TBN booster(s) | 0.0-1.0 | 0.0-0.5 |
| Corrosion inhibitor(s) | 0.0-5.0 | 0.0-2.0 |
| Metal dihydrocarbyldithiophosphate(s) | 0.1-6.0 | 0.1-4.0 |
| Ash-free phosphorus compound(s) | 0.0-6.0 | 0.0-4.0 |
| Antifoaming agent(s) | 0.0-5.0 | 0.001-0.15 |
| Antiwear agent(s) | 0.0-1.0 | 0.0-0.8 |
| Pour point depressant(s) | 0.0-5.0 | 0.01-1.5 |
| Viscosity index improver(s) | 0.0-20.0 | 0.25-12.0 |
| Friction modifier(s) | 0.01-5.0 | 0.05-2.0 |
| Base oil(s) | Balance | Balance |
| Total | 100 | 100 |

The percentages of each component above represent the weight percent of each component, based upon the weight of the final lubricating oil composition. The remainder of the lubricating oil composition consists of one or more base oils.

Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent).

In certain embodiments of the present disclosure, the method of using the lubricating oil composition is capable of reducing the timing chain stretch to 1% or less, or 0.05% or less, as measured by the Ford Chain Wear Test over 216 hours. Also, in certain embodiments of the invention, the engine is a spark ignition engine or, more particularly, a spark ignition passenger gasoline car engine.

The invention also contemplates use of the lubricating oil compositions described above for reducing the timing chain stretch or elongation of a timing chain of an engine such as a spark ignition engine or a spark ignition passenger car engine.

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the scope of the disclosure.

A series of tests were carried out to determine the impact of overbased calcium sulfonate and zinc dialkyl dithiophosphates (ZDDPs) on chain stretch. The operation of the timing chain was simulated by the Ford Chain Wear Test described in greater detail below.

Each of the lubricating oil compositions contained a major amount of a base oil and a base conventional dispersant inhibitor (DI) package, wherein the base DI package provided about 8 to about 12 percent by weight of the lubricating oil composition. The base DI package contained conventional amounts of dispersant(s), antiwear additive(s), antioxidant(s), friction modifier(s), and pour point depressant(s) as set forth in Table 2. The major amount of base oil was present in an amount of about 78 to about 87 wt. % in the lubricating oil composition. The components that were varied are specified in the tables and discussion of the Examples below. All the values listed are stated as weight percent of the component in the lubricating oil composition (i.e., active ingredient plus diluent oil, if any), unless specified otherwise.

TABLE 2

| Components of DI Package | Wt. % |
|---|---|
| Antioxidant(s) | 0.5 to 2.5 |
| Antiwear agent(s), including any metal dihydrocarbyl dithiophosphate | 0.0 to 5.0 |
| Detergent(s)* | 0.0 |
| Dispersant (s) | 2.0 to 6.0 |
| Friction modifier(s) | 0.05 to 1.25 |
| Pour point depressant(s) | 0.05 to 0.5 |
| Viscosity Index Improver(s) | 0.25 to 9.0 |

*Detergent and Molybdenum are varied in the following experiments, so for purposes of the base formulation, the detergent amount is set to zero.

Comparative Example 1

To understand how significant the effects of wear are on the chain stretch of a timing chain, a control sample was run with no detergents or anti-wear additives included in the lubricant. This sample had a viscosity grade of 5W-20 and contained 87.92 wt % of a base oil with an additive package which contained no overbased calcium sulfonate, magnesium sulfonate, or ZDDP. The additive package delivered 1.4 wt. % of an antioxidant, 0.23 wt. % of friction modifier, 0.2 wt. % of pour point depressant, 80 ppm of molybdenum from a molybdenum compound and 4.9 wt. % of viscosity index improver to the lubricating oil composition.

Comparative Example 2

Comparative Example 2 was carried out in the same manner as Comparative Example 1, except the additive package additionally delivered 850 ppm of Zn and 790 ppm phosphorus from a ZDDP anti-wear agent.

Comparative Example 3

Comparative Example 3 was carried out in the same manner as Comparative Example 1, except the additive package additionally delivered 2300 ppm of Ca from an overbased calcium sulfonate detergent.

Comparative Example 4

Comparative Example 4 was carried out in the same manner as Comparative Example 1, except the additive package additionally delivered 3500 ppm of Ca from an overbased calcium sulfonate detergent, 72 ppm molybdenum from a molybdenum compound, and 820 ppm of Zn and 690 ppm of phosphorus from a ZDDP anti-wear agent.

Comparative Example 5

Comparative Example 5 was carried out in a similar manner to Comparative Example 4 to determine if there may be a correlation between an overbased calcium sulfonate detergent and the effect on chain stretch. This sample had a viscosity grade of 5W-30 and the composition of the lubricating oil was determined by ICP analysis. Table 3 provides the composition of CE-5.

TABLE 3

| Comparative Example 5 | |
|---|---|
| 9.85 | Kinematic Viscosity at 100° C., ($mm^2$/sec) |
| 2097 | calcium (ppmw) |
| 7 | magnesium (ppmw) |
| 72 | molybdenum (ppmw) |
| 700 | phosphorus (ppmw) |
| 810 | zinc (ppmw) |
| 58.16 | kinematic viscosity at 40° C. ($mm^2$/sec) |
| 217 | boron (ppmw) |
| 18 | silicon (ppmw) |

The lubricating oils of Comparative Examples 1-2 were tested using a test duration of 144 hours using the Ford Chain Wear Test and the lubricating oils of Comparative Examples 3-5 were tested using test durations of 144 hours and 216 hours, and then the timing chain was tested for chain stretch.

Ford Chain Wear Test

The Ford Chain Wear Test is a method of evaluating the timing chain stretch in an engine. The Ford Chain Wear Test employs a 2012 Ford 2.0 Liter EcoBoost TGDi Four-cylinder test engine. The engine was run at the low to moderate speed and load at low and normal running temperatures in a two stage test. The test cycle consists of an 8 hour break-in period followed by 216 hours of cyclic test conditions. The timing chain is measured after the break-in period and this measurement is used as the baseline measurement for the end-of-test chain elongation calculation. Stage 1 of the test runs at low speed, low load and low temperatures with an enriched combustion cycle. Stage 2 runs at moderate speed, moderate load and moderate temperatures using stoichiometric conditions. Between Stage 1 and Stage 2, the temperatures, speeds, and loads are ramped at specified rates.

The test duration for the comparative examples was measured at 144 hours and, in some cases, 216 hours. All inventive examples were tested using a test duration of 216 hours.

The results are presented in Table 4 below.

TABLE 4

| Comparative Example | CE-1 | CE-2 | CE-3 | CE-4 | CE-5 |
|---|---|---|---|---|---|
| Viscosity Grade | 5W-20 | 5W-20 | 5W-20 | 5W-20 | 5W-30 |
| Total Ca in Lubricating Composition (ppm) | 0 | 0 | 2140 | 3360 | 2097 |
| Total Zn in Lubricating Composition (ppm) | 0 | 850 | 0 | 760 | 728 |
| Sulfur (ppm) to Molybdenum (ppm) ratio | 9.5 | 29.6 | 13.4 | 37.3 | 34.4 |
| Chain Stretch over 144 hours (%) | 0.18 | 0.13 | 0.05 | 0.05 | 0.06 |

Comparative Examples 1-5 show that the addition of ZDDP anti-wear agent alone provided a reduction in chain stretch relative to the baseline composition and that addition of the overbased calcium sulfonate detergent provided a far more significant reduction in chain stretch relative to the baseline composition and the ZDDP-containing composition. Comparative Examples 4 and 5 show that the effect of adding overbased calcium sulfonate detergent may not be purely additive. CE-5 contains a very large amount of calcium which results in a high sulfur to molybdenum ratio and is undesirable because the amount of chain stretch is unacceptable.

Further testing was done using fully formulated oils again using the Ford Chain Wear Test to compare the effects of molybdenum and a borated dispersant on chain stretch.

Comparative Example 6

Comparative Example 6 employed a GF-5 commercial engine oil as a baseline test. The engine oil was formulated from a mixture of a 5W-30 viscosity grade base oil and an additive package. The additive package delivered 1380 ppm of Ca from a calcium sulfonate detergent, 340 ppm of Mg from a magnesium sulfonate detergent, 850 ppm of Zn from a ZDDP anti-wear agent, 160 ppm of molybdenum, and 310 ppm of boron from the dispersant. The additive package delivered 0.2 wt. % of a pour point depressant, 5.2 wt. % of a dispersant, 0.32 wt. % of a friction modifier, 8.6 wt. % of a viscosity index improver, 1.4 wt. % of an antioxidant, and 1.12 wt. % of a ZDDP anti-wear agent to the engine oil.

Comparative Example 7

Comparative Example 7 employed the GF-5 commercial engine oil of Comparative Example 6 which contained an additive package modified to deliver 1430 ppm of Ca from an overbased calcium sulfonate detergent, 420 ppm of Mg from a magnesium sulfonate detergent, and only 270 ppm of boron from the dispersant. In addition the modified additive package delivered 4.7 wt. % of a dispersant, 7.5 wt. % of a viscosity index improver, and 1.25 wt. % of an antioxidant to the engine oil.

Inventive Example 1

Inventive Example 1 employed a lubricating composition that was 80.74 wt. % of a 5W-30 viscosity grade base oil and an additive package. The additive package delivered 1200 ppm of Ca from a calcium sulfonate detergent, 470 ppm of Mg from a magnesium sulfonate detergent, 710 ppm of Zn from a ZDDP anti-wear agent, 170 ppm of molybdenum, and 290 ppm of boron from the dispersant. The additive package additionally delivered 0.5 wt. % of a pour point depressant, 5.04 wt. % of a dispersant, 0.4 wt. % of a friction modifier, 8.6 wt. % of a viscosity index improver, 0.94 wt. % of a ZDDP anti-wear agent, and 1.3 wt. % of an antioxidant to the lubricating oil composition.

Inventive Example 2

Inventive Example 2 employed a lubricating composition that was 81.2 wt. % of a 5W-30 viscosity grade base oil and an additive package. The additive package delivered 1430 ppm of Ca from an over based calcium sulfonate detergent, 420 ppm of Mg from a magnesium sulfonate detergent, 850 ppm of Zn from a ZDDP anti-wear agent, 240 ppm of molybdenum, and 310 ppm of boron from the dispersant. The additive package delivered 0.2 wt. % of a pour point depressant, 5.5 wt. % of a dispersant, 0.5 wt. % of a friction modifier, 8 wt. % of a viscosity index improver, and 1.4 wt. % of an antioxidant to the lubricating composition.

Inventive Example 3

Inventive Example 3 was carried out in a similar manner to Inventive Example 2, except the additive package delivered only 330 ppm of Mg from the magnesium sulfonate detergent.

The lubricating oils of Inventive Examples 1-3 were tested over a test duration of 216 hours using the Ford Chain Wear Test and then the chain was tested for chain stretch. The results are presented in Table 5 below.

TABLE 5

| Example | CE-5* | CE-6 | CE-7 | IE-1 | IE-2 | IE-3 |
|---|---|---|---|---|---|---|
| Viscosity Grade | 5W-30 | 5W-30 | 5W-30 | 5W-30 | 5W-30 | 5W-30 |
| Ca from overbased calcium sulfonate detergent (ppm) | — | 1380 | 1430 | 1200 | 1430 | 1430 |
| Mg from magnesium sulfonate detergent (ppm) | — | 340 | 420 | 470 | 420 | 330 |
| B from the dispersant (ppm) | — | 310 | 270 | 290 | 310 | 310 |
| Mo (ppm) | 70 | 160 | 160 | 170 | 240 | 240 |
| Zn from the ZDDP (ppm) | — | 850 | 850 | 710 | 850 | 850 |
| ppm of Sulfur / ppm of Molybdenum | 34.4 | 16.8 | 11.8 | 9.9 | 7.9 | 11.3 |
| ppm of Nitrogen from dispersants / ppm of Boron | — | 2.6 | 2.7 | 2.7 | 2.8 | 2.8 |
| ppm of Boron[1] / TBN from total detergent | — | 63.2 | 49.0 | 58.2 | 56.3 | 63.0 |
| Ca from overbased and neutral/low based detergents (ppm) / ppm Mo | — | 8.6 | 8.9 | 7.1 | 6.0 | 6.0 |
| ppm of Total metal from detergent / ppm of Boron | — | 5.5 | 6.9 | 5.8 | 6.0 | 5.7 |
| TBN of total lubricating composition[1] | 7.1 | 7.5 | 7.9 | 7.5 | 8.2 | 7.6 |
| Chain Stretch over 216 hours (%) | 0.10 | 0.12 | 0.10 | 0.09 | 0.09 | 0.07 |

[1]TBN was calculated using the method of ASTM-D2896 and is given as mg KOH/g composition.
*See Table 3.

Comparative Examples 5-7 and Inventive Examples 1-3 show that the presence of a combination of higher amounts of molybdenum and boron from the dispersant reduces the chain stretch, when in the additional presence of ZDDP, a magnesium detergent, and a calcium detergent. Also, these examples highlight that compositions that provided reduced chain stretch had a calculated TBN of 7.5-8.2 mg KOH/g composition, a ratio of ppm sulfur to ppm molybdenum of 7.9-11.3, a ratio of ppm nitrogen from dispersant to ppm of total boron in the lubricating oil of 2.7-2.8, a ratio of ppm total metal from detergent to ppm boron in the lubricating composition of from 5.7-6.0, and a ratio of ppm total boron to TBN introduced from the total detergent of from 56.3-63.0. Also, for lubricating oils with a molybdenum content greater than 160 ppm, the ratio of ppm total calcium from overbased and neutral/low based detergent to ppm molybdenum was 6.0-8.9.

Further testing was done using fully formulated oils again using the Ford Chain Wear Test to compare the effects of various additives formulated in 0W-16 viscosity grade base oils.

Comparative Example 8

Comparative Example 8 employed a lubricating composition that was 85.35 wt. % of a 0W-16 viscosity grade base oil and an additive package. The additive package delivered 1430 ppm of Ca from an over based calcium sulfonate detergent, 340 ppm of Mg from a magnesium sulfonate detergent, 850 ppm of Zn from a ZDDP anti-wear agent, 240 ppm of Mo, and 200 ppm of boron from the dispersant. The additive package delivered 0.2 wt. % of a pour point depressant, 3.9 wt. % of a dispersant, 0.52 wt. % of a friction modifier, 4.7 wt. % of a viscosity index improver, and 1.4 wt. % of an antioxidant to the lubricating composition.

Inventive Example 4

Inventive Example 4 employed a lubricating composition that was a mixture of a 0W-16 viscosity grade base oil and an additive package that delivered 1430 ppm of Ca from an overbased calcium sulfonate, 370 ppm of Mg from a magnesium sulfonate detergent, 850 ppm of Zn from a ZDDP anti-wear agent, 600 ppm of Mo from a friction modifier, and 310 ppm of boron from the dispersant. The additive package delivered 0.2 wt. % of a pour point depressant, 5.24 wt. % of a dispersant, 0.8 wt. % of a friction modifier, 6 wt. % of a polymaleic anhydride viscosity index improver, 1.4 wt. % of an antioxidant, and 1.12 wt. % of a ZDDP anti-wear agent to the lubricating composition.

The Ford Chain Wear Test results obtained after testing the foregoing lubricating oils for a test duration of 216 hours are shown in Table 6. The observed chain stretch was significantly less for timing chains lubricated with lubricants containing an overbased calcium detergent, a borated dispersant and molybdenum content, as compared with lubricants containing normal ZDDP anti-wear agents or dispersants.

TABLE 6

| Example | CE-5* | CE-8 | IE-4 |
|---|---|---|---|
| Viscosity Grade | 5W-30 | 0W-16 | 0W-16 |
| Ca from overbased calcium sulfonate detergent (ppm) | — | 1430 | 1430 |
| B from the dispersant (ppm) | — | 200 | 310 |
| Mo (ppm) | 70 | 240 | 600 |
| Zn from the ZDDP (ppm) | — | 850 | 850 |
| $\frac{\text{ppm of Sulfur}}{\text{ppm of Molybdenum}}$ | 34.4 | 11.3 | 4.2 |
| $\frac{\text{ppm of Nitrogen from dispersant}}{\text{ppm of Boron}}$ | — | 3.1 | 2.8 |
| $\frac{\text{Total ppm of Calcium}}{\text{Total ppm of Molybdenum}}$ | 27.6 | 6.0 | 2.4 |
| $\frac{\text{ppm of Boron}}{\text{TBN from total detergent}}$ | — | 40.3 | 58.4 |
| $\frac{\text{ppm of Total metal from detergent}}{\text{ppm of Boron}}$ | — | 8.9 | 5.8 |
| TBN of total lubricating composition[1] | 7.1 | 7.2 | 8.0 |
| Chain Stretch over 216 hours (%) | 0.10 | 0.11 | 0.07 |

[1]TBN was calculated using the method of ASTM-D2896 and is given as mg KOH/g composition
*See Table 3

These results show that a ratio of ppm nitrogen from dispersant to the ppm of boron under 3.0 provides better chain stretch results. Also, a TBN of the total lubricating composition of greater than 7.5 mg KOH/g composition was needed to obtain good chain stretch results. These examples also show the importance of having a ratio of ppm boron to the TBN from the total detergent in excess of 42.2 to obtain good chain stretch results.

Inventive Example 5

Inventive Example 5 employed a lubricating composition that was a mixture of a 5W-30 viscosity grade base oil and an additive package that delivered 1370 ppm of Ca from an overbased calcium sulfonate, 370 ppm of Mg from a magnesium sulfonate detergent, 850 ppm of Zn from a ZDDP anti-wear agent, 160 ppm of Mo from a friction modifier, and 310 ppm of B from a dispersant. The additive package delivered 0.2 wt. % of a pour point depressant, 5.24 wt. % of a borated dispersant that is a reaction product of an olefin copolymer with a succinic anhydride, and at least one polyamine, and wherein the borated dispersant is post-treated with an aromatic carboxylic acid, an aromatic polycarboxylic acid, or an aromatic anhydride wherein all carboxylic acid or anhydride groups are attached directly to an aromatic ring, and with a non-aromatic dicarboxylic acid or anhydride having a number average molecular weight of less than 500, 0.8 wt. % of a friction modifier, 6 wt. % of a polymaleic anhydride viscosity index improver, 1.4 wt. % of an antioxidant, and 1.12 wt. % of a ZDDP anti-wear agent to the lubricating composition.

The Ford Chain Wear Test results obtained for the foregoing lubricating oils are shown in Table 7.

TABLE 7

| Example | CE-5* | CE-6 | IE-5 |
|---|---|---|---|
| Viscosity Grade | 5W-30 | 5W-30 | 5W-30 |
| Ca from overbased calcium sulfonate detergent (ppm) | — | 1380 | 1370 |
| B from the dispersant (ppm) | — | 310 | 310 |
| Mo (ppm) | 70 | 160 | 160 |
| Zn from the ZDDP (ppm) | — | 850 | 850 |
| $\frac{\text{ppm of Sulfur}}{\text{ppm of Molybdenum}}$ | 34.4 | 16.8 | 16.8 |
| $\frac{\text{ppm of Nitrogen from dispersant}}{\text{ppm of Boron}}$ | — | 2.6 | 2.6 |
| $\frac{\text{Total ppm of Calcium}}{\text{Total ppm of Molybdenum}}$ | 27.6 | 8.6 | 8.6 |
| $\frac{\text{ppm of Boron}}{\text{TBN from total detergent}}$ | — | 63.2 | 63.2 |
| $\frac{\text{ppm of Total metal from detergent}}{\text{ppm of Boron}}$ | — | 5.5 | 5.5 |
| TBN of total lubricating composition[1] | 7.1 | 7.5 | 7.5 |
| Chain Stretch over 216 hours (%) | 0.10 | 0.12 | 0.04 |

[1]TBN was calculated using the method of ASTM-D2896 and is given as mg KOH/g composition
*See Table 3

A significant improvement in the reduction in chain stretch is shown in Inventive Example 5.

Other embodiments of the present disclosure will be apparent to those skilled in the art from consideration of the specification and practice of the embodiments disclosed herein. As used throughout the specification and claims, “a” and/or “an” may refer to one or more than one. Unless otherwise indicated, all numbers expressing quantities of ingredients, properties such as molecular weight, percent, ratio, reaction conditions, and so forth used in the specification and claims are to be understood as being modified in all instances by the term “about,” whether or not the term “about” is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

All patents and publications cited herein are fully incorporated by reference herein in their entirety.

The invention claimed is:

1. A method for reducing timing chain stretch in an engine comprising a step of lubricating said timing chain with a lubricating oil composition comprising:

a major amount of a base oil; and a minor amount of an additive package including:

a) at least one overbased calcium detergent in an amount sufficient to provide 1000 ppm to 1800 ppm by weight of calcium to the total weight of the lubricating oil composition, b) at least one borated dispersant, c) a metal dialkyl dithiophosphate, and;

d) at least one oil soluble molybdenum compound;

wherein the lubricating oil composition has a TBN value of at least 7.5 mg KOH/gram lubricating oil composition, determined using the method of ASTM-2896, at least 80 ppm of molybdenum based on a total weight of the lubricating oil composition, a weight ratio of total calcium in the lubricating oil composition to total molybdenum in the lubricating oil composition of less than 8.4; and a weight ratio of nitrogen from the dispersant in the lubricating composition to total boron in the lubricating oil composition of from 2.6 to 3.0, and the lubricating oil composition is capable of reducing the timing chain stretch in an engine to 0.09% or less, as measured by the Ford Chain Wear Test over 216 hours.

2. The method of claim 1, wherein the base oil has an SAE Viscosity grade of 5W and the lubricating oil composition has a ratio of total ppm of boron in the lubricating oil composition to the TBN of total detergent in the lubricating oil composition of from 45 to 63.

3. A method for reducing timing chain stretch in an engine comprising a step of lubricating said timing chain with a lubricating oil composition comprising:

a major amount of a base oil; and a minor amount of an additive package including:

a) at least one overbased calcium detergent in an amount sufficient to provide 1000 ppm to 1800 ppm by weight of calcium to the total weight of the lubricating oil composition, b) at least one borated dispersant, c) a metal dialkyl dithiophosphate, and;

d) at least one oil soluble molybdenum compound;

wherein the lubricating oil composition has a TBN value of at least 7.5 mg KOH/gram lubricating oil composition, determined using the method of ASTM-2896, at least 80 ppm of molybdenum based on a total weight of the lubricating oil composition, a weight ratio of total calcium in the lubricating oil composition to total molybdenum in the lubricating oil composition of less than 8.4; and a weight ratio of nitrogen from the dispersant in the lubricating composition to total boron in the lubricating oil composition of from 2.6 to 3.0, wherein the lubricating oil composition has a ratio of total ppm of boron in the lubricating oil composition to the TBN of total detergent in the lubricating oil composition of from 50 to 63, and the lubricating oil composition is capable of reducing the timing chain stretch in an engine to 0.09% or less, as measured by the Ford Chain Wear Test over 216 hours.

4. The method of claim 2 wherein the lubricating oil composition has a ratio of total ppm of boron in the lubricating oil composition to the TBN of total detergent in the lubricating oil composition of from 56 to 63.

5. The method of claim 1, wherein the lubricating oil composition has a weight ratio of total boron in the lubricating oil composition to total nitrogen in the lubricating oil composition of less than 1.0.

6. The method of claim 1, wherein the lubricating oil composition has a weight ratio of total sulfur in the lubricating oil composition to total molybdenum in the lubricating oil composition of from about 1:1 to 17:1.

7. The method of claim 1, wherein the base oil has a SAE viscosity grade of 5W-30 and the lubricating oil composition has a total molybdenum content of greater than 150 ppm.

8. The method of claim 1, wherein the lubricating oil composition contains an amount of overbased calcium-containing detergent that provides from 1100 ppm to 1600 ppm of calcium to the lubricating oil composition, based on a total weight of the lubricating oil composition.

9. The method of claim 1, wherein the lubricating oil composition has a phosphorus content from 100 ppm to 1000 ppm.

10. The method of claim 1, wherein the lubricating oil composition has a weight ratio of ppm metal from the detergent in the lubricating oil composition to the total ppm of boron in the lubricating oil composition of from 5.7 to 8.5.

11. The method of claim 1, wherein the lubricating oil composition has a weight ratio of ppm metal from the detergent in the lubricating oil composition to the total ppm of boron in the lubricating oil composition of from 5.7 to 6.5.

12. The method of claim 1, wherein the metal dialkyl dithiophosphate is a zinc dialkyl dithiophosphate and the zinc dialkyl dithiophosphate delivers 700 ppm to about 900 ppm of zinc to the lubricating oil composition.

13. The method of claim 1, wherein the additive package comprises at least one detergent selected from the group consisting of a magnesium sulfonate detergent, and a neutral calcium sulfonate detergent.

14. The method of claim 1, wherein the base oil has a viscosity grade of 0W-16, and the lubricating oil composition has a total boron content of at least 200 ppm, a total molybdenum content of at least 600 ppm, and a total sulfur content of no greater than 2550 ppm.

15. The method of claim 1, wherein the lubricating oil composition has a total boron content of no greater than 310 ppm and the lubricating oil composition includes at least one non-borated dispersant.

16. The method of claim 1, wherein the engine is a spark ignition engine.

17. The method of claim 1, wherein the engine is a spark ignition passenger car gasoline engine.

18. The method of claim 1, wherein the lubricating oil composition is capable of reducing the timing chain stretch in an engine to 0.1% or less, as measured by the Ford Chain Wear Test over 216 hours.

19. The method of claim 1, wherein the additive package further comprises one or more additives selected from the group consisting of antioxidants, friction modifiers, pour point depressants, and viscosity index improvers.

20. A method for reducing timing chain stretch in an engine comprising a step of lubricating said timing chain with a lubricating oil composition comprising:

a major amount of a base oil; and a minor amount of an additive package including:

a) at least one overbased calcium detergent in an amount sufficient to provide 1000 ppm to 1800 ppm by weight of calcium to the total weight of the lubricating oil composition, b) a borated dispersant that is a reaction product of an olefin copolymer, a succinic anhydride, and at least one polyamine, and wherein the borated dispersant is post-treated with an aromatic carboxylic acid, an aromatic polycarboxylic acid, or an aromatic anhydride wherein all carboxylic acid or anhydride groups are attached directly to an aromatic ring, and with a non-aromatic dicarboxylic acid or anhydride having a number average molecular weight of less than 500, c) a metal dialkyl dithiophosphate, and;

d) at least one oil soluble molybdenum compound;

wherein the lubricating oil composition has a TBN value of at least 7.5 mg KOH/g of the lubricating oil composition, determined using the method of ASTM-2896, at least 80 ppm of molybdenum based on a total weight of the lubricating oil composition, a weight ratio of total calcium in the lubricating oil composition to total molybdenum in the lubricating oil composition of less than 8.8; and a weight ratio of nitrogen from the dispersant in the lubricating composition to total boron in the lubricating oil composition of from 2.6 to 3.0, and the lubricating oil composition is capable of reducing the timing chain stretch in an engine to 0.09% or less, as measured by the Ford Chain Wear Test over 216 hours.

* * * * *